US012189677B1

(12) United States Patent
Jin et al.

(10) Patent No.: US 12,189,677 B1
(45) Date of Patent: Jan. 7, 2025

(54) USER INTERFACES FOR PRESENTING MEDIA ITEMS

(71) Applicant: Beijing Zitiao Network Technology Co., Ltd., Beijing (CN)

(72) Inventors: Zi Jin, Beijing (CN); Jingjing Tu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/651,248

(22) Filed: Apr. 30, 2024

(51) Int. Cl.
*G06F 16/45* (2019.01)
*G06F 3/0481* (2022.01)
*G06F 3/0484* (2022.01)
*G06F 16/438* (2019.01)

(52) U.S. Cl.
CPC ............ *G06F 16/45* (2019.01); *G06F 3/0481* (2013.01); *G06F 3/0484* (2013.01); *G06F 16/438* (2019.01)

(58) Field of Classification Search
CPC ....................................................... G06F 16/45
See application file for complete search history.

(56) References Cited

U.S. PATENT DOCUMENTS

| 10,684,738 B1* | 6/2020 | Sicora .................... G06F 3/0482 |
| 2016/0048544 A1* | 2/2016 | Hughes ............... G06F 16/9558 |
| | | 707/737 |

OTHER PUBLICATIONS

SocialMediaToday.com [online], "Instagram Updates Hashtag Search To Broaden Discovery," Mar. 21, 2024, retrieved on Jul. 26, 2024, retrieved from URL<https://www.socialmediatoday.com/news/instagram-updates-hashtag-search-broaden-discovery/711072/>, 3 pages.

* cited by examiner

*Primary Examiner* — Van H Oberly
(74) *Attorney, Agent, or Firm* — Fish & Richardson P.C.

(57) ABSTRACT

User interfaces for presenting media items are described. In one example, an electronic device receives a user input specifying a hashtag in a first user interface of an application of an electronic device, and in response, provides, for display, a second user interface that comprises a first portion, a second portion, and a third portion, wherein: the first portion is configured to receive a sequence of text, and the sequence of text comprises the hashtag by default; the second portion comprises a search result based on the hashtag, the search result comprises a plurality of media items associated with the hashtag; and the third portion is configured to receive one or more user interactions for creating a new media item.

19 Claims, 13 Drawing Sheets

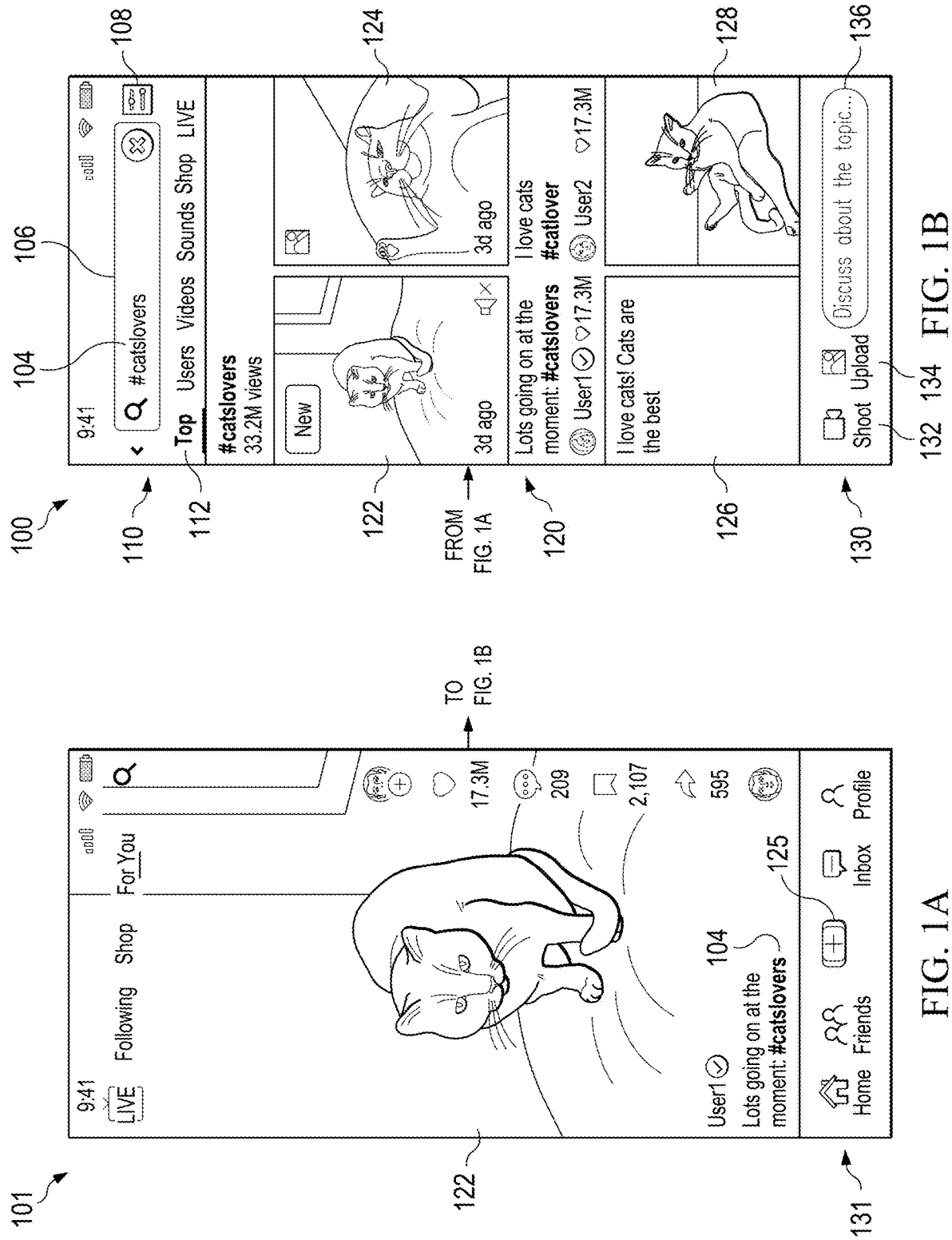

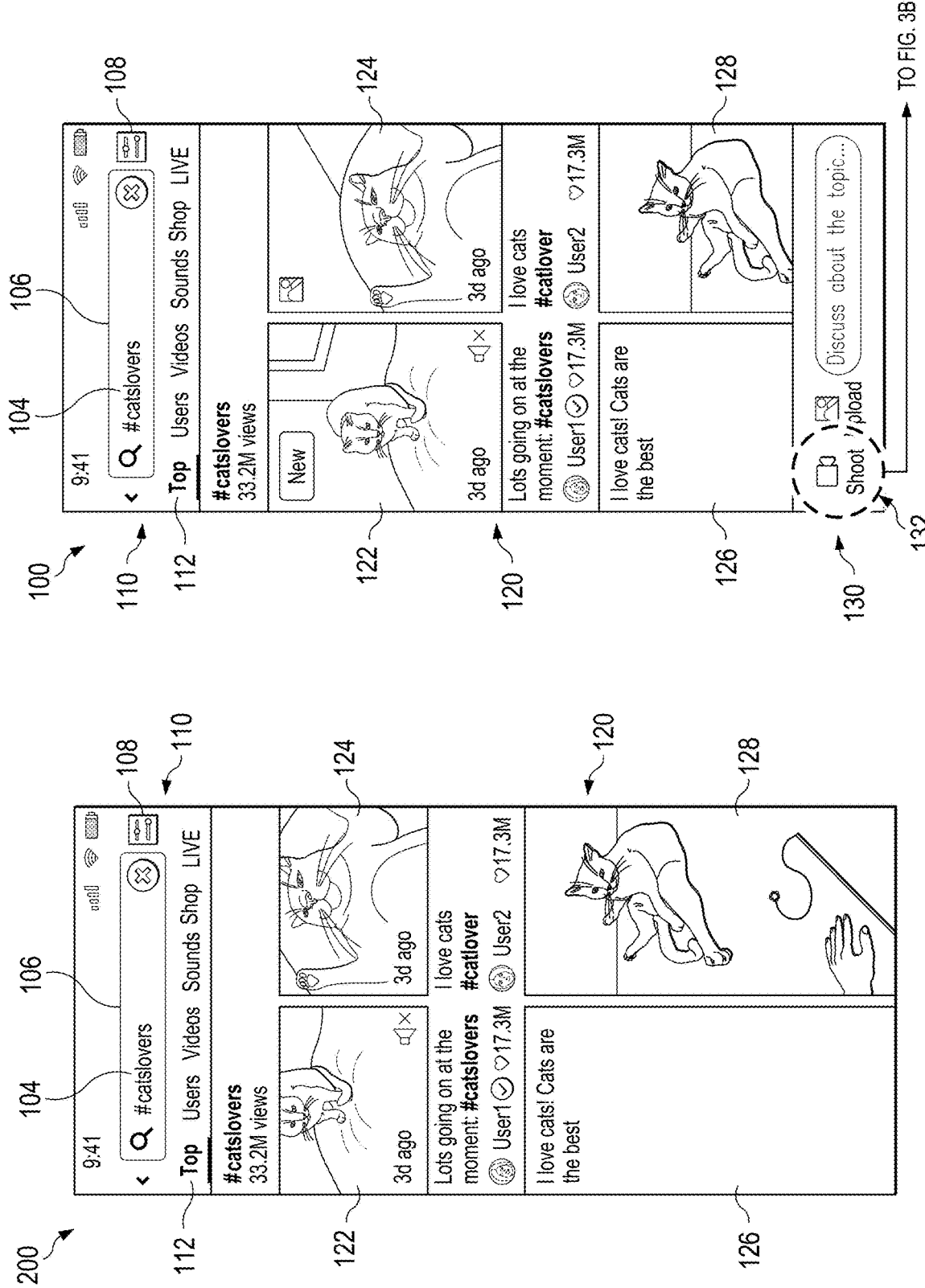

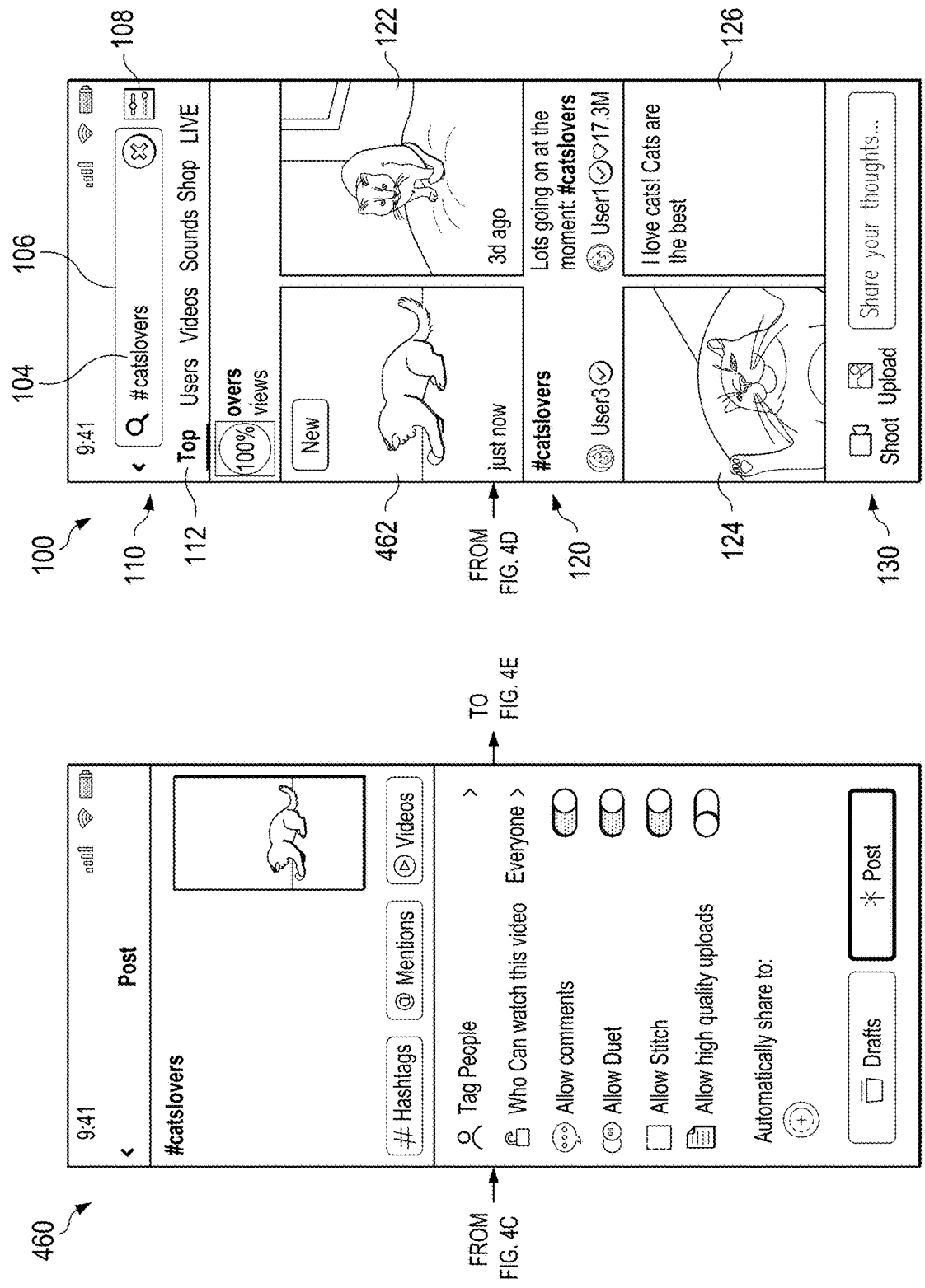

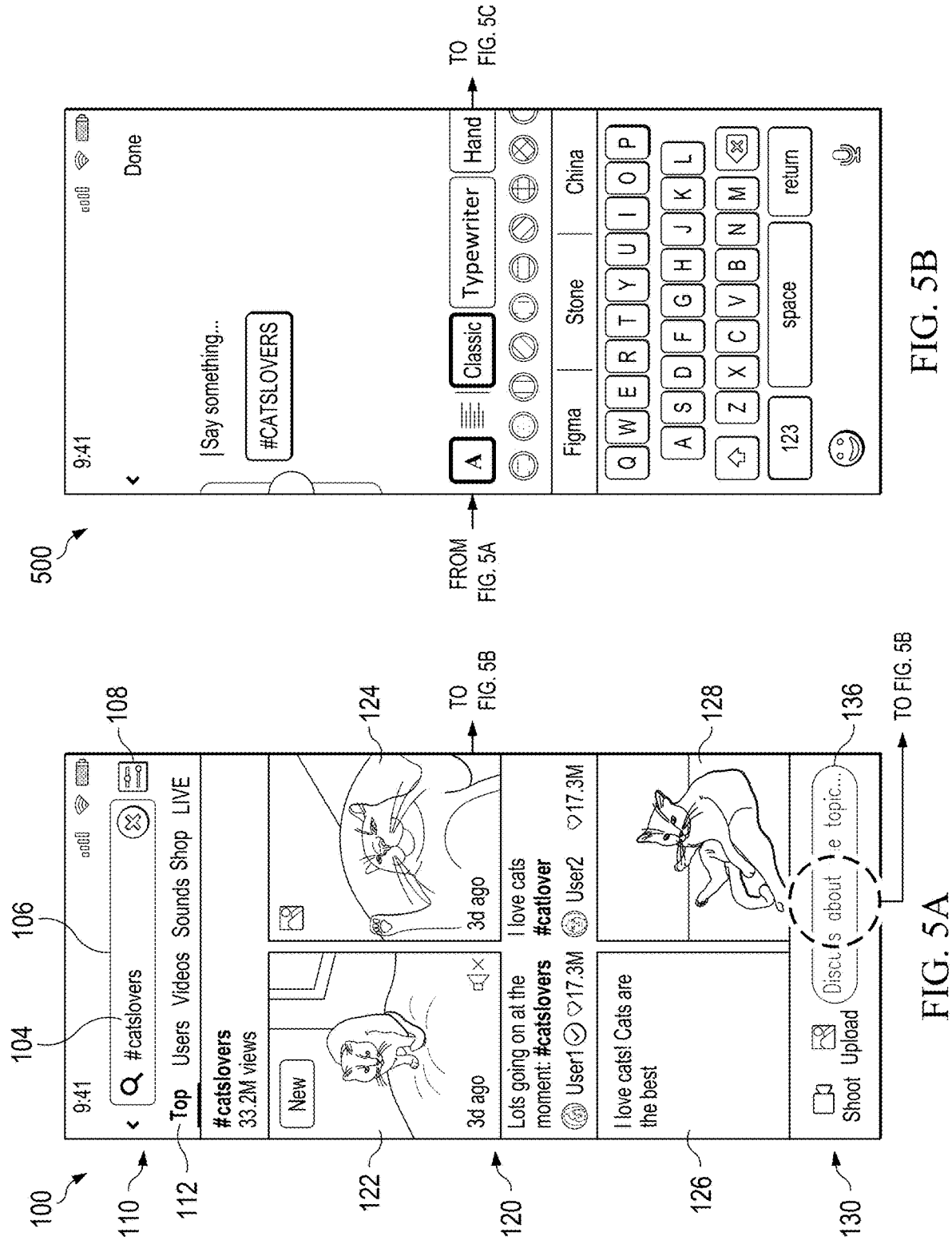

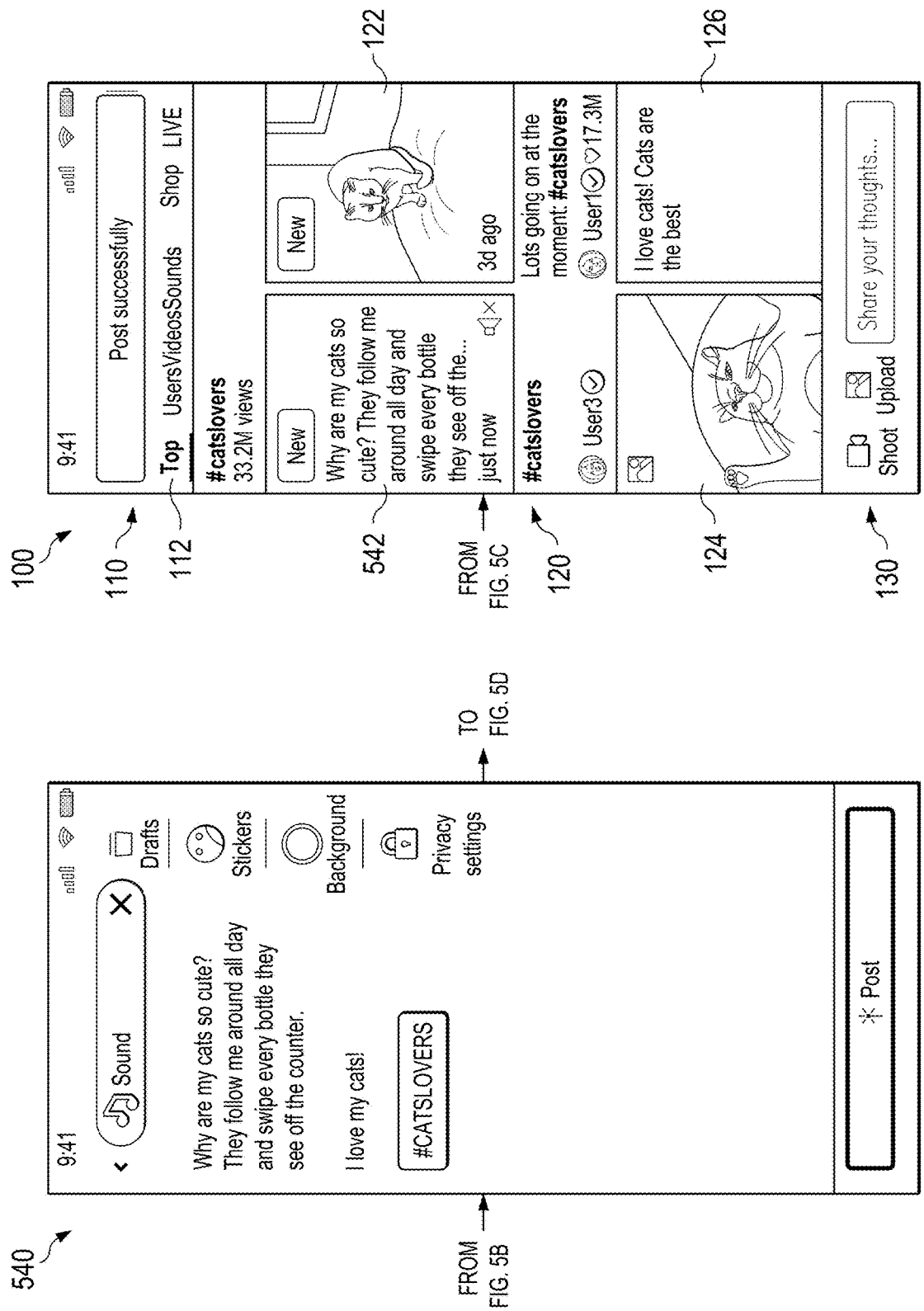

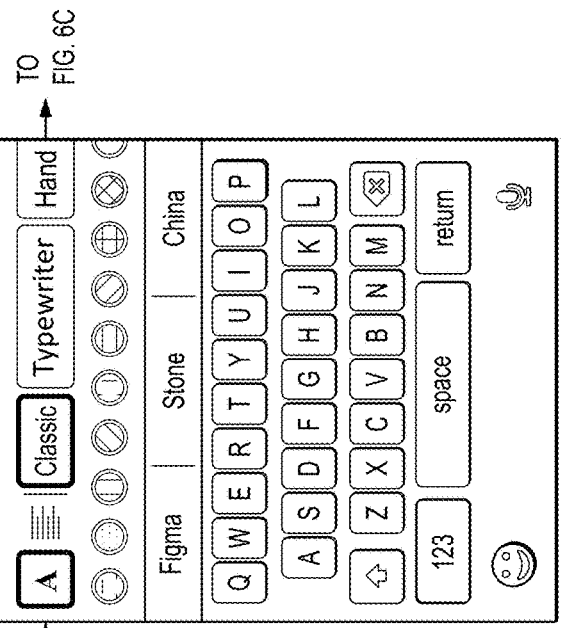
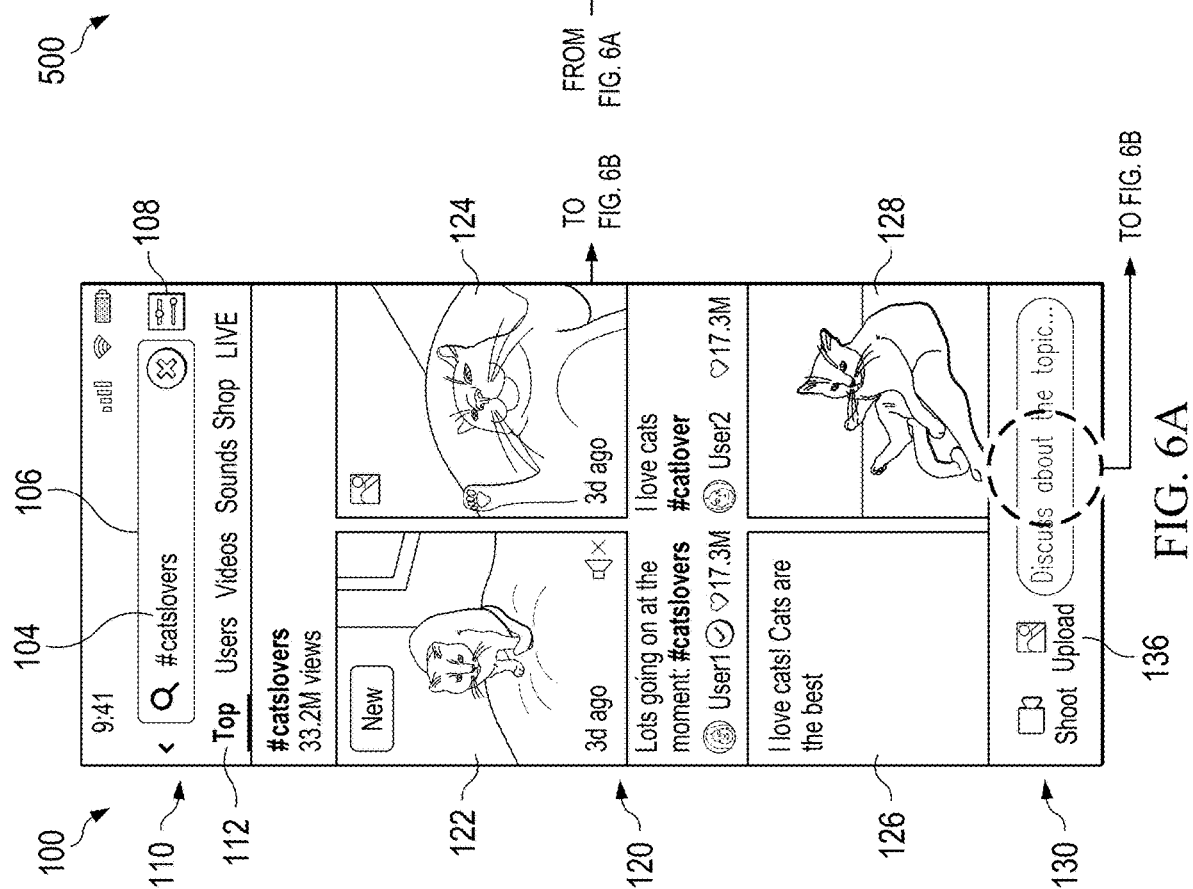
FIG. 6B
FIG. 6A

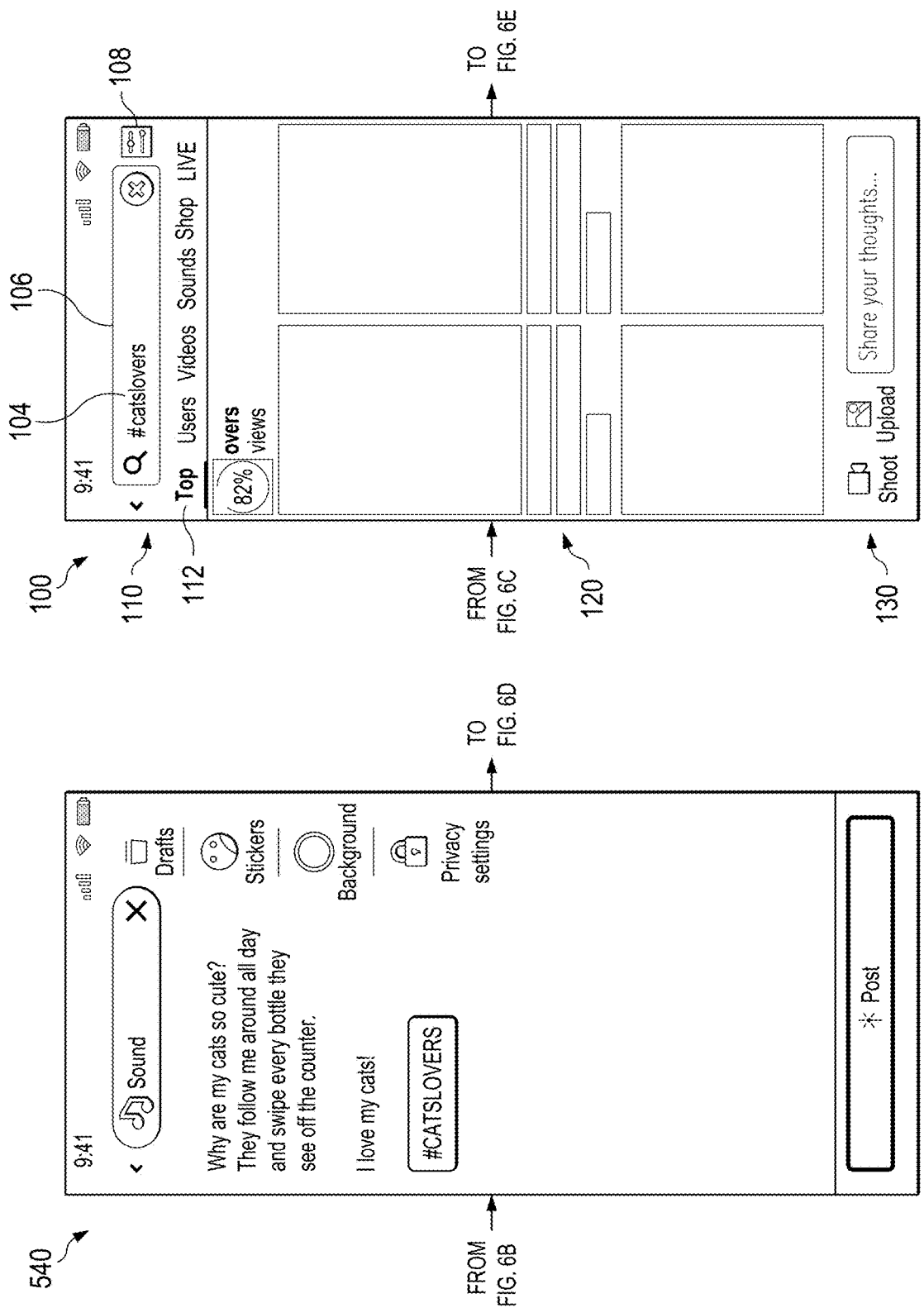

USER INTERFACES FOR PRESENTING MEDIA ITEMS

TECHNICAL FIELD

The present disclosure generally relates to presenting media items, for example, media items that are associated with a hashtag.

BACKGROUND

Some platforms enable users to create media items that other users of the platform can view and interact with. A user can use an application of the platform on an electronic device of the user to view and interact with media items. A user can also use the application to search for media items to view and interact with.

SUMMARY

This specification describes user interfaces for displaying media items.

The media items can include, for example, videos, images, audio, and/or text. Each media item can also include text, e.g., have a corresponding text description for the media item, that is provided by the user that created the media item.

In one aspect, the present disclosure describes a method. The method includes the following operations: in response to receiving a user input specifying a hashtag in a first user interface of an application of an electronic device, replacing, for display by the electronic device, the first user interface with a second user interface that comprises a first portion, a second portion, and a third portion, wherein: the first portion is configured to receive a sequence of text, and the sequence of text comprises the hashtag by default; the second portion comprises a search result based on the hashtag, the search result comprises a plurality of media items associated with the hashtag; and the third portion is configured to receive one or more user interactions for creating a new media item.

In another aspect, the present disclosure describes an apparatus including one or more processors and one or more computer-readable memories coupled to the one or more processors. The one or more computer-readable memories store instructions that are executable by the one or more processors to perform the above-described operations.

In still another aspect, the present disclosure describes a non-transitory computer-readable storage medium. The non-transitory computer-readable storage medium stores programing instructions executable by one or more processors to perform the above-described operations.

In some implementations, these general and specific aspects may be implemented using a system, a method, or a computer program, or any combination of systems, methods, and computer programs. The foregoing and other described aspects can each, optionally, include one or more of the following aspects:

In some implementations, the new media item automatically comprises the hashtag.

In some implementations, the method further comprises: receiving a user instruction to remove the hashtag from the new media item; and removing the hashtag from the new media item.

In some implementations, the first user interface does not include the third portion.

In some implementations, the plurality of media items associated with the hashtag comprise a text-based media item, a graphic media item, or a hybrid media item.

In some implementations, the search result based on the hashtag for a first user is different from a search result based on the hashtag for a second user.

In some implementations, the plurality of media items associated with the hashtag comprise at least one media item that was not assigned the hashtag by a user.

In some implementations, in response to receiving the user input specifying the hashtag, the method further comprises obtaining data representing the search result, and wherein the search result is generated by performing a search algorithm to identify the plurality of media items associated with the hashtag from a database of media items.

In some implementations, the data representing the search result comprises a respective ranking for each of the plurality of media items and the method further comprises: displaying the plurality of media items according to the respective rankings, wherein a respective ranking for a media item is determined based on features comprising one or more of: content of the media item, a relevance of the content of the media item to the hashtag, a text description for the media item, a creation time for the media item, a creator of the media item, an interaction history of the media item, or an interaction history of a user of the electronic device.

In some implementations, the third portion is a hidable third portion, and the method further comprises: receiving one or more user interactions with the second portion that satisfy a threshold condition; and in response, updating the second user interface to not display the third portion.

In some implementations, the method further comprises determining a time duration for a display of the third portion in the second user interface; and in response to determining that the time duration exceeds a threshold time, updating the second user interface to not display the third portion.

In some implementations, the third portion is a hidable third portion, and the hidable third portion comprises a plurality of interactive elements for receiving the one or more user interactions for creating a new media item, and wherein the plurality of interactive elements comprise: a first interactive element controllable to access a camera accessible by the application, a second interactive element controllable to access a media library accessible by the application, and a third interactive element controllable to receive a text input.

In some implementations, the method further comprises: receiving a first user interaction to one of the plurality of interactive elements; in response to receiving the first user interaction, providing one or more third user interfaces to allow a user to create a new media item; and adding the hashtag to the new media item by default.

In some implementations, the method further comprises: receiving a first user interaction to one of the plurality of interactive elements; in response to receiving the first user interaction, providing one or more third user interfaces to allow a user to create a new media item; and in response to receiving a second user interaction indicating finishing creation of the new media item, providing the second user interface, wherein the new media item is displayed in the second portion of the second user interface.

In some implementations, the new media item is displayed in a top-ranked position of the second portion relative to respective positions of the plurality of media items.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1A is an illustration of an example user interface that displays a media item.

FIG. 1B is an illustration of an example user interface that displays media items associated with a hashtag and enables users to create a new media item.

FIG. 2 is an illustration of an example user interface that displays media items associated with a hashtag.

FIGS. 3A-3D are illustrations of example user interfaces that enable users to create a new media item.

FIGS. 4A-4E are illustrations of example user interfaces that enable users to create a new media item.

FIGS. 5A-5D are illustrations of example user interfaces that enable users to create a new media item.

FIGS. 6A-6F are illustrations of example user interfaces that enable users to create a new media item.

Like reference numbers and designations in the various drawings indicate like elements.

DETAILED DESCRIPTION

Figures 3B, 3C:
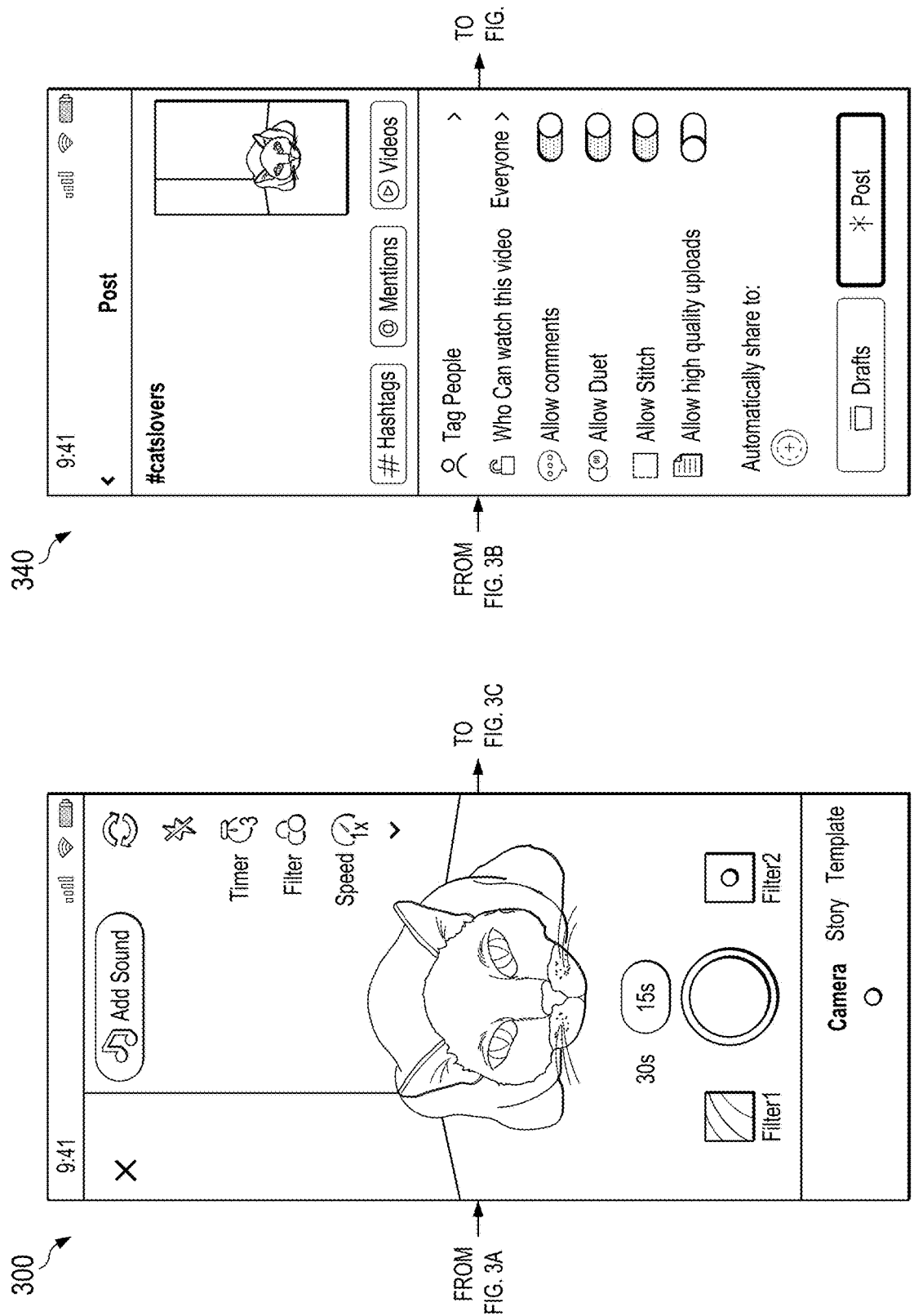

In general, this specification describes example techniques for providing user interfaces for displaying media items. The media items can be associated with a hashtag specified by a user. The user interfaces can also enable the user to create a new media item associated with the hashtag. The user interfaces can be configured to receive user interactions, e.g., through interactive elements, to specify the hashtag to be searched and to create the new media item.

The user interfaces for displaying media items can be included or provided in one or more applications/programs of an electronic device. For example, the applications/programs can include one or more of a social networking application, a photo/video posting/sharing application, a web-browsing application, or integrate functionalities of one or more of these and other applications/programs. An example application can be a video sharing application that allows a user to create content, for example, by uploading and editing media such as text, image, video, and/or audio, and sharing the created content publicly or within one or more groups, for example, in the form of a post. The application can also include social networking features or services that allow other users to interact, through the application, with the user who uploads or create the post.

A post can include graphics, e.g., image and/or video, text, and/or audio. A post can have a different viewing permissions, such as viewing permissions based on the creator's approval, or and/or viewing time limits from a creation time for the post. As an example, a post can include a temporary story that is available for viewing for a limited amount of time, a post that is available for viewing for a longer period of time, a sound, a product or promotion, or a livestream.

Users can view posts and interact with posts in different viewing modes. For example, the system can provide a feed viewing mode that presents a stream of posts to the user. In some examples, the posts presented to the user are personalized, i.e., the posts are curated based on the user's interests, prior interactions, and viewing habits. The system can also provide a full post mode that presents each post in a larger portion of the screen and displays more information about the post such as comments, likes, and shares for the post. The full post mode can also support enhanced user interaction with the content, allowing for actions like liking, commenting, sharing, and exploring the content creator's profile. Additional interactive features in the full post mode may include the ability to create duets or stitches with the media, provided these functionalities are enabled by the content creator.

The system can also allow users to invoke a search functionality for a particular topic, and the system can present posts associated with the topic to the user, allowing the user to explore the topic. The described techniques provide example user interfaces that can provide media items for display that allow a user to more easily create a new media item related to the media items provided for display. In some implementations, a user interface can include everything from the layout of the screen, the design of the buttons and icons, to the responsiveness of the electronic device when a user interacts with it. For an electronic device that includes a display or screen such as a touchscreen, the user interface can include a graphical user interface (GUI). In some implementations, the user interacts with the GUI, for example, through finger contacts and/or gestures on or in front of the touchscreen.

The user interfaces can be provided for display by a system implemented as computer programs on one or more computers in one or more locations. The system can include an electronic device such as smart phones, pads, tablets, TVs, or other computer devices or terminals. In some implementations, the system can also include one or more servers that are remote from the electronic device.

In some implementations, the system may receive a user input identifying a hashtag, or a sequence of text that includes a text identifier and one or more characters that make up one or more search keywords, from the user through a first portion of the user interface. The system can obtain a search result that includes media items associated with the hashtag for display in a second portion of the user interface. The system can also provide a third portion of the user interface that allows the user to create a new media item that includes the hashtag. The system allows users to more easily interact with and contribute to the discussion around the topics related to the hashtag.

Some conventional user interfaces that allow for creating a new media item associated with a particular hashtag upon viewing media items with the hashtag may require the user to manually add the hashtag to the media item. The user interfaces described in this specification allow a user to create a new media item associated with the particular hashtag directly upon viewing media items with the hashtag, and can thus provide for a shortened path and more convenient user experience for creating a new media item.

The described techniques provide example user interfaces that can also allow users to more easily interact with and contribute to the discussion around the topics related to the hashtag by providing options for creating a variety of different types of new media items. For example, the third portion can include interactive elements that allow the user to create a new media item by accessing a media library accessible by the application, by accessing a camera accessible by the application, or by receiving a text input. Providing an interactive element that receives a text input can allow a user to create a text-focused media item, allowing the user to more quickly and easily contribute to the discussion.

The described techniques provide example user interfaces that can further provide the new media item created by the user for display in the second portion in a top-ranked position relative to the media items of the search result. The user interfaces can thus provide for a rewarding user experience that allows the user to view their new media item in the context of the media items of the search result.

The described techniques provide example user interfaces that can also provide for an efficient user experience for users that may not want to create a new media item associated with the hashtag. For example, if the system receives user interactions with the second portion that satisfy a threshold condition, such as a threshold number of swipes, the system can hide the third portion from display.

The described techniques provide example user interfaces that can present a wide variety of media items for display that are associated with the hashtag. Conventional user interfaces may display only media items that include the hashtag in the corresponding text descriptions for the media items. In order for a creator to have the media items they create included in the search result for the hashtag, the creator may have to manually add the hashtag to the text description. This may lead to an inconvenient user experience for the creator and result in incomplete search results if the creator did not include the hashtag in the text description.

The described techniques provide example user interfaces that can display media items that are associated with the given hashtag. For example, not all of the media items displayed may include the hashtag in the text descriptions. For example, the system can display media items that are associated with the hashtag by obtaining a search result generated by a search algorithm that identifies media items with content related to the hashtag. These techniques allow for displaying to the user a wider variety of media items that do not necessarily include the hashtag without requiring the user to enter different hashtags for searching, which reduces the computational burden placed on the electronic device locally or one or more servers to generate search results for each of the different hashtags. These techniques also reduce the network bandwidth required for transmitting search results to electronic devices.

FIG. 1A is an illustration of an example user interface 101 that displays a media item. The user interface 101 is an example of a first user interface. The user interface 101 is provided for display on an electronic device that includes an application of a platform (e.g., a social network platform). The user interface 101 can be provided for display by, for example, a system executing one or more programs of the application. The system can include the electronic device, and/or one or more remote servers that can communicate with the electronic device.

In the example of FIG. 1A, the user interface 101 displays a media item 122 in a full post mode. For example, the user interface 101 displays information such as comments, likes, and shares. The user interface 101 also displays a corresponding text description for the media item 122. For example, the corresponding text description includes "Lots going on at the moment: #catslovers," where "#catslovers" 104 is an example hashtag.

The user interface 101 allows a user to interact with the media item, such as by providing interactive elements for liking, commenting on, and/or sharing the media item. The user interface 101 also allows a user to interact with the corresponding text description for the media item. For example, the user interface 101 can allow a user to select or click on any hashtags (e.g., "#catslovers" 104) that are present in the corresponding text description.

An interactive element can include an icon, a button, a symbol or other type or shape of element that is displayed in a user interface and can trigger further actions by the system upon a user interaction (e.g., clicking, tapping, pressing, swiping) with the interactive element.

In some implementations, the user interface 101 also includes a portion 131. The portion 131 includes interactive elements that allow the user to navigate to different pages, e.g., an inbox page or a profile page, of the application. In some implementations, the portion 131 includes an interactive element 125 that allows the user to create a new media item. In some implementations, in response to selection of the interactive element 125, additional interactive elements may appear that allow the user to select one of different types/modes for content creation.

FIG. 1B is an illustration of an example user interface 100 that displays media items associated with a hashtag and enables users to create a new media item. The user interface 100 is an example of a second user interface. For example, the system can transition from the user interface 101 of FIG. 1A to the user interface 100 of FIG. 1B (e.g., by providing the user interface 100 for display in place of the user interface 101) in response to receiving a user input identifying a hashtag 104.

The system can provide the user interface 100 in response to receiving a user input identifying a hashtag 104. A hashtag is a sequence of text that includes a text identifier, e.g., the symbol "#," and one or more characters. The one or more characters can serve as one or more search keywords. In the example of FIG. 1B, the hashtag 104 includes "#catslovers." In this disclosure, the term "text" can include one or more letters, numbers, symbols, or other characters. In some examples, the hashtag does not include a text identifier. For example, the hashtag can include "catslovers" without the text identifier "#."

For example, the system can receive the user input identifying the hashtag 104 through another user interface, for example, that displays one or more hashtags. For example, the system can receive the user input identifying the hashtag 104 through the user interface 101 of FIG. 1A. The user input can be an input to or a click or selection of the hashtag "#catslovers" 104 on the user interface 101. In some implementations, a click or selection of a hashtag includes a search request, and automatically leads to the display of the user interface 100 from the another user interface, without a need to select an interactive element such as a "Search" icon/button.

Thus, in response to receiving the user input identifying the hashtag 104 to the user interface 101 of FIG. 1A, the system can provide the user interface 100 of FIG. 1B for display. For example, the system can replace the user interface 101 with the user interface 100. That is, the system can render the user interface 100 and its portions for display by the electronic device in response to receiving the user input identifying the hashtag 104, replacing the entire user interface 101.

As another example, the system can receive the user input specifying the hashtag 104 through another user interface that provides a search functionality. For example, the user input can be an input to or a selection of an interactive element such as a "Search" icon/button, after typing out or copying and pasting "#catslovers" in a search bar. For example, the other user interface can include a portion similar to the portion 110 for receiving the user input specifying the hashtag 104. The system can render the user interface 100 and its portions for display by the electronic device in response to receiving the user input identifying the hashtag 104, replacing the other user interface.

The user interface 100 includes a first portion 110, a second portion 120, and a third portion 130. The system renders the first portion 110, second portion 120, and third portion 130 in response to receiving the user input identifying the hashtag 104. As an example, the third portion 130 is generated/rendered in response to receiving the user input identifying the hashtag 104, replacing, for example, at least some or all of the existing content displayed in the other user interface. For example, the third portion 130 can be rendered and displayed in the user interface 100 in the place of the portion 131 of the user interface 101.

The first portion 110 is configured to receive user inputs for media item search. For example, the first portion 110 can include a search bar 106 to receive a sequence of text. The sequence of text can include a hashtag, and/or other text input. In some implementations, the first portion 110 shows that the sequence of text includes the hashtag 104 by default. For example, after receiving the user input that specifies the hashtag 104, the system automatically provides the hashtag 104 for display in the search bar 106. In some implementations, the search bar 106 can omit the text identifier, e.g., the symbol "#," from the hashtag and only display the one or more characters following the text identifier in the hashtag.

In some examples, the first portion 110 can include one or more interactive elements for adjusting the search functionality, such as, advanced search options with filters and other configurations. For example, the first portion 110 can include interactive elements 108 for filters such as category and date. The first portion 110 can also include interactive elements for adjusting or filtering the type of search, such as a tab 112 for displaying a search result that includes all types of media items, or a tab for displaying a search result that is limited to one or more of media types that include user accounts, videos, sounds/audio, shopping/merchandise, live streams, etc. For example, when the tab 112 is selected, the system can generate and update the user interface 100 to display a search result that includes a selected type of media items.

The second portion 120 includes a search result based on the user inputs in the first portion 110. For example, the search result includes multiple media items associated with the hashtag 104. For example, FIG. 1B shows four media items 122, 124, 126, and 128 that are associated with the hashtag 104. The media items associated with the hashtag can be of a variety of types. For example, the media items can include a plain text media item or a text-based media item, a graphic media item such as a photo or a video, or a hybrid media item that includes both graphics and text.

The second portion 120 can display at least a subset of the media items of the search result. For example, as shown in FIG. 1B, the second portion 120 displays media items 122, 124, 126, and 128. In some examples, a search result (e.g., for a very specific hashtag) may include a smaller number of media items than shown in FIG. 1B. In some examples, the search result can include a larger number of media items that are not displayed in the second portion 120. The second portion 120 can display other media items of the search result in response to receiving a user interaction such as an upward scroll or swipe from the user to request more media items of the search result.

In some implementations, the second portion 120 can display data representing the media items, such as visual previews, data identifying creators of the media items, and measures of popularity for the media items. For example, the media item 122 is a video depicting a cat, that also includes audio. The second portion 120 displays a graphic representation of the media item 122. For example, the second portion can display a preview of the video or a particular frame of the video. In some implementations, the second portion 120 can also display the corresponding text description of the media item 122, such as the example shown in FIG. 1B as "Lots going on at the moment: #catslovers." In some implementations, the second portion 120 can also display data identifying a creator of the media item 122, such as an account name or username, such as the example shown in FIG. 1B as "User1." In some implementations, the second portion 120 can also display data indicating a measure of popularity for the media item 122, such as the example shown in FIG. 1B as having been "liked" 17.3 million times.

The second portion 120 can display data representing the media items in a grid, list, or another layout. The second portion 120 is shown in FIG. 1B as displaying data representing the media items 122, 124, 126, and 128 in a grid layout. Based on the size of the screen of the electronic device on which the user interface 100 is displayed, and the amount of progress the user has made through the search result, e.g., through scrolling up or down, one or more of the media items may be partially displayed. For example, in FIG. 1B, the media items 126 and 128 are partially displayed. The second portion 120 displays part of the graphic representations for the media items 126 and 128, and does not display data identifying the creators or data indicating a measure of popularity for the media items 126 and 128.

The system can obtain data representing the search result by, for example, performing a search algorithm locally by the electronic device and/or one or more servers, or by receiving data representing the search result from the one or more servers. The search result can be generated by identifying the media items from a database of media items. The database of media items can be associated with the platform and stored on one or more computers remote to the electronic device.

For example, in response to receiving the user input specifying the hashtag 104, the system can obtain data representing the search result by providing the hashtag 104 as input to a search algorithm. For example, the search algorithm can identify media items that have a corresponding text description that includes the hashtag 104.

In some examples, the identified media items can include one or more media items that do not have a corresponding text description that includes the hashtag 104, i.e., the one or more media items were not assigned the hashtag by a user. For example, FIG. 1B shows that the media item 124 does not include "#catslovers" in the corresponding text description. In some implementations, the search result can also include media items that are related to the hashtag 104, e.g., media items that have a corresponding text description that includes synonyms or variants for the one or more search keywords of the hashtag 104, media items that have visual or graphic content that includes the search keywords of the hashtag 104 or their synonyms or variants, and/or audio content that mentions the search keywords of the hashtag 104 or their synonyms or variants. An example search algorithm is described in further detail below with reference to FIG. 7.

The system can display the identified media items according to a ranking. That is, the identified media items can be displayed in a position within the grid or list layout according to the ranking. In the example of FIG. 1B, the media item 122 is the top-ranked media item, the media item 124 is the second-ranked media item, the media item 126 is the third-ranked media item, and the media item 128 is the fourth-ranked media item. Out of the media items currently displayed in the second portion 120, the top-ranked media item is displayed in a top-ranked position, e.g., in the top left corner of the grid. The second-ranked media item is displayed in second-ranked position, e.g., the top right corner of the grid. The third-ranked media item is displayed in the third-ranked position, e.g., the bottom left corner of the grid. The fourth-ranked media item is displayed in the fourth-ranked position, e.g., the bottom right corner of the grid.

For example, the data representing the search result can include a ranking for each of the media items based on features such as content of the media item, a relevance of the content of the media item to the hashtag, a text description for the media item, a creation time for the media item, a creator of the media item, an interaction history of the media item, or an interaction history of a user of the electronic device. Example features for the ranking are described in further detail below with reference to FIG. 7.

The third portion 130 is configured to receive one or more user interactions for creating a new media item. In some examples, the third portion 130 is a hidable portion. That is, the system can collapse, remove, or otherwise hide the third portion 130 from display in the user interface 100 of the application, rather than persistently displaying this portion in different user interfaces or pages of the application. For example, in response to a condition being satisfied (e.g., the user has not interacted with the third portion for a threshold amount of time), the system can remove the third portion 130 from display in the user interface 100 while maintaining the portion 110 and the portion 120. In some implementations, the third portion 130 can disappear and re-appear in the user interface 100. An example of the user interface 100 with the third portion 130 hidden is described below with reference to FIG. 2.

The third portion 130 can receive the one or more user interactions for creating a new media item using interactive elements such as interactive elements 132, 134, and 136. Each of the interactive elements of the third portion 130 are controllable by the user to create a new media item. For example, each of the interactive elements of the third portion 130 can correspond to a different type of media item and/or mode of creation for a media item. In some implementations, the third portion 130 can display the multiple interactive elements 132, 134, and 136 at the same time. In some implementations, by displaying multiple interactive elements at the same time, the third portion 130 enables the user to directly select one of the multiple interactive elements in the user interface 100 to create a media item of a particular type or in a particular mode, providing a faster and more efficient way for content creation, compared to other implementations such as where only one interactive element (e.g., interactive element 125) is provided for content creation in the user interface (e.g., the user interface 101) and only in response to selection of the one interactive element (e.g., interactive element 125), do additional interactive elements appear that allow the user to select one of different types/modes for content creation.

Upon receiving a user interaction to one of the interactive elements of the third portion 130, the system can provide one or more third user interfaces to allow the user to create a new media item. The system can add the hashtag 104 to the new media item created by the user by default, as described below with reference to FIGS. 3-6. The system can also, upon creation of the new media item by the user, provide the user interface 100 for display, and include the new media item in the second portion 120, as described below with reference to FIGS. 3-6.

As an example, the user can create a new media item by capturing a video or photo. The interactive element 132, also referred to as a first interactive element, is controllable to access a camera that is accessible by the application. Upon receiving a user interaction, e.g., a selection, to the interactive element 132, the system provides a sequence of user interfaces that allow the user to create a new media item including the captured video or photo, as described below with reference to FIG. 3.

As another example, the user can create a new media item by using one or more existing videos or photos. The interactive element 134, also referred to as a second interactive element, is controllable to access a media library accessible by the application. Upon receiving a user interaction, e.g., a selection, to the interactive element 134, the system provides a sequence of user interfaces that allow the user to create a new media item including the existing video or photo, as described below with reference to FIG. 4.

As another example, the user can create a new media item by inputting text. The interactive element 136, also referred to as a third interactive element, is controllable to receive a text input. Upon receiving a user interaction, e.g., a selection or text input, to the interactive element 136, the system provides a sequence of user interfaces that allow the user to create a new media item including the text such as a plain text media item, as described below with reference to FIGS. 5-6.

FIG. 2 is an illustration of an example user interface 200 that displays media items associated with a hashtag. For example, the system can transition from the user interface 100 of FIG. 1B to the user interface 200 (e.g. by updating the user interface 100) after a condition has been satisfied.

The user interface 200 includes a first portion 110 and a second portion 120, which can be the same as or similar to the first portion 110 and the second portion 120 as described with reference to FIG. B1. In some examples, due to receiving one or more user interactions, the second portion 120 shown in FIG. 2 may display different media items, or different parts of the same media items, of the second portion 120 shown in FIG. 1B. For example, FIG. 2 shows that the area that had displayed the second portion 120 in FIG. 1B now displays more of the content items 126 and 128 that had been partially displayed in the second portion 120 of FIG. 1B.

The user interface 200 does not include a third portion such as the third portion 130 of FIG. 1B that enables users to create a new media item. For example, after a condition has been satisfied, the system updates the user interface 100 to hide the third portion or to cause the third portion to disappear, and thus does not include the third portion in the user interface 200. The area covered by the third portion can be replaced with more content of the second portion. For example, the area covered by the third portion can be replaced with more content items, or more of the existing content items displayed in the second portion.

The system can determine that a condition has been satisfied based on user interactions received and/or time. For example, the condition can be based on time, such as a length or duration of time that the third portion 130 has been displayed. If the time duration that the third portion 130 has been displayed equals or exceeds a threshold time, the system can update the user interface 100 to the user interface 200 to not display the third portion 130. That the third portion 130 has been displayed for a period of time and the user has not interacted with the third portion 130 can indicate that the user does not want to create a new content item. By hiding the third portion 130, the system can provide for a flexible user experience.

As another example, the condition can be based on user interactions, such as a number, type, and/or frequency of user interactions. For example, the system can determine that a threshold condition is met if the number of upward scrolls or downward scrolls to the second portion 120 exceeds a threshold number of upward scrolls or downward scrolls. As another example, the system can determine that a threshold condition is met if the frequency of upward scrolls or downward scrolls to the second portion 120 exceeds a threshold frequency of upward scrolls. If the number or threshold of user interactions to the second portion 120 meets a threshold condition, the system can update the user interface 100 to the user interface 200 to not display the third portion 130.

In some implementations, an upward scroll, or a scrolling-up gesture, is a user interaction that allows a user to access different content that may not fit on the screen of the electronic device. For example, if the system receives an upward scroll to the second portion 120, the system updates the second portion 120 to display different content items, e.g., content items with lower rankings than the existing content items displayed in the second portion, more of the existing content items displayed in the second portion, and/or less of the existing content items displayed in the second portion.

In some implementations, a downward scroll, or a scrolling-down gesture, is a user interaction that allows a user to access different content that may not fit on the screen of the electronic device. For example, if the system receives a downward scroll to the second portion 120, the system updates the second portion 120 to display different content items, e.g., content items with higher rankings than the existing content items displayed in the second portion, more of the existing content items displayed in the second portion, and/or less of the existing content items displayed in the second portion.

Upward and downward scrolls or other user gestures or interactions with the second portion 120 can indicate that the user wants to explore media items of the search result. By hiding the third portion, the system can thus provide for a flexible user experience that adapts to the user's actions and allows the user to explore media items more efficiently.

As another example, the system can determine that the threshold condition has been satisfied if the system has not received any user interactions to the second portion 120 for at least a threshold period of time. If the time duration since the previous user interaction to the second portion 120 equals to or exceeds a threshold time, the system can update the user interface 100 to the user interface 200 to not display the third portion 130. That the user has not interacted with the second portion 120 can indicate that the user is viewing a media item displayed in the second portion 120 and does not want to create a new content item. By hiding the third portion 130, the system can provide for a flexible user experience.

FIGS. 3A-3D are illustrations of example user interfaces that enable users to create a new media item. In particular, FIGS. 3A-3D show a sequence of user interfaces for creating a new media item with a video or photo captured using a camera of the electronic device that is accessible by the application.

FIG. 3A shows the same user interface 100 described above with reference to FIG. 1B. Upon receiving a user interaction, e.g., a selection, to the interactive element 132, the system provides a sequence of user interfaces that allow the user to capture a video or photo and to create a new media item including the captured video or photo.

The system can transition from the user interface 100 of FIG. 3A to the user interface 300 of FIG. 3B upon receiving a user interaction to the interactive element 132. The user interface 300 is an example of a third user interface. The user interface 300 includes one or more interactive elements, e.g., a record button, that enables the user to start/stop recording a video using the camera. The interactive elements can also enable the user to capture a photo using the camera. After taking the photo or video, the system can also update the user interface 300 to include interactive elements that enable the user to edit the photo or video. For example, the interactive elements can enable the user to add or edit audio, text, effects, filters, etc.

The system can transition from the user interface 300 of FIG. 3B to the user interface 340 of FIG. 3C upon receiving a user interaction that indicates the user has finished editing the photo or video through user interface 300. For example, the system can receive a user interaction (e.g., a click or press) to a "Next" button or another interactive element that indicates the user has finished editing the photo or video. Upon receiving a user interaction to the "Next" button, the system can provide subsequent user interfaces for creation of the new media item, such as the user interface 340. The user interface 340 is an example of a third user interface. The user interface 340 includes one or more interactive elements that enable the user to edit features of the media item including the captured photo or video. For example, the interactive elements can enable the user to add or edit the corresponding text description for the media item, a location for the media item, permissions for the media item, etc.

In the example shown in FIG. 3C, the corresponding text description includes the hashtag 104 by default. For example, the interactive element that enables the user to add or edit the corresponding text description for the media item displays "#catslovers."

In some examples, the system can receive a user interaction to the interactive element that indicates an edit to the text "#catslovers" or removal of "#catslovers." In these examples, the new media item created does not include the hashtag "#catslovers."

FIG. 3C also includes a confirmation interactive element, such as the "Post" button, that indicates the user is finished creating the new media item. In some examples, in response to receiving the user interaction to the "Post" button, the system can also provide data representing the new media item to add the new media item to the database of media items. For example, the system can provide data representing the new media item to the database of media items if the user provides permission to make the new media item public through the appropriate interactive element in FIG. 3C. In some examples, the system or another system can process the content of the new media item prior to adding the new media item to the database of media items. For example, the system can process the content for the presence of particular types of content matching predetermined keywords, and may not add the new media item to the database of media items if the new media item includes the particular types of content.

Figures 3D, 4A:
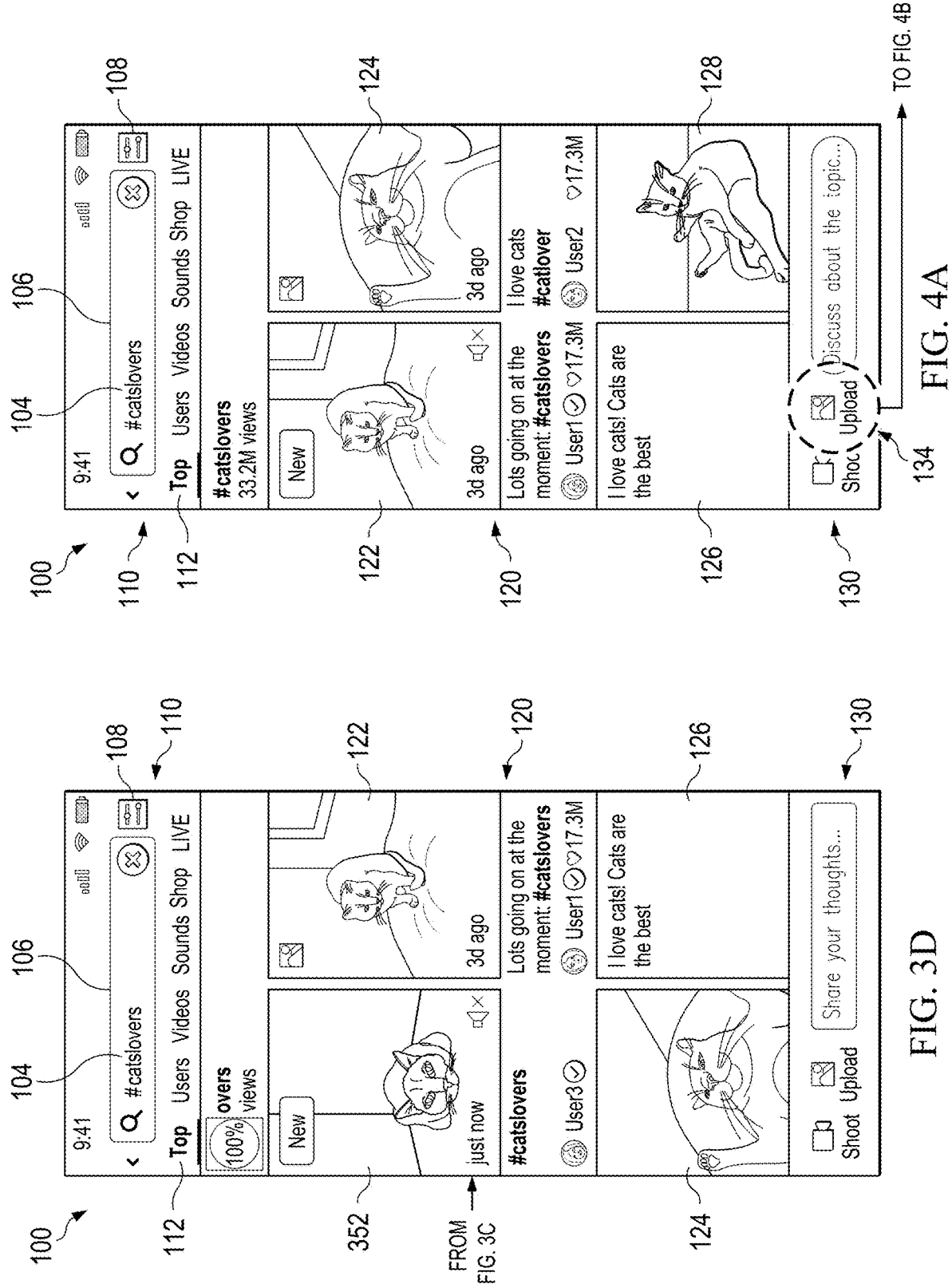

The system can transition from the user interface 340 of FIG. 3C to the user interface 100 of FIG. 3D upon receiving a user interaction that indicates the user has finished editing features of the new media item through user interface 340. For example, the system can receive a user interaction to the "Post" button shown in FIG. 3C.

The user interface 100 of FIG. 3D is similar to the user interface 100 of FIG. 3A, but the system has updated the user interface 100 to include the new media item 352 created through FIGS. 3B-3C. In the example of FIG. 3, the system did not receive a user interaction indicating an edit or removal of the hashtag, e.g., through the user interface 340, so, the new media item automatically includes the hashtag 104. For example, the system displays the new media item 352 in the second portion 120. FIG. 3D also shows that the new media item 352 was added recently, as denoted by the text "just now," by the user, "User3."

In some examples, the system displays the new media item 352 in a top-ranked position of the second portion 120, relative to the positions of the media items of the search result (e.g., the media items of the search result performed based on the hashtag 104 before the creation of the new media item 352). For example, the media item 352 is displayed in the top-ranked position, e.g., the top-left corner of the grid. The positions of the media items of the search result are adjusted by one position. That is, the top-ranked media item 122 is now displayed in the second-ranked position, e.g., the top-right corner of the grid. The second-ranked media item 124 is now displayed in the third-ranked position, e.g., the bottom-left corner of the grid. The third-ranked media item 126 is now displayed in the fourth-ranked position, e.g., the bottom-right corner of the grid. The system can thus display the new media item 352 created by the user in the top-ranked position among the media items associated with the hashtag 104, as a confirmation that the new media item 352 has been successfully uploaded or submitted, providing for a satisfying user experience.

FIGS. 4A-4E are illustrations of example user interfaces that enable users to create a new media item. In particular, FIGS. 4A-4E show a sequence of user interfaces for creating a new media item with a video or photo stored in a media library of the electronic device that is accessible by the application.

FIG. 4A shows the same user interface 100 described above with reference to FIG. 1B. Upon receiving a user interaction, e.g., a selection, to the interactive element 134, the system provides a sequence of user interfaces that allow the user to select one or more existing videos and/or photos and to create a new media item including the selected videos and/or photos.

Figure 4C:
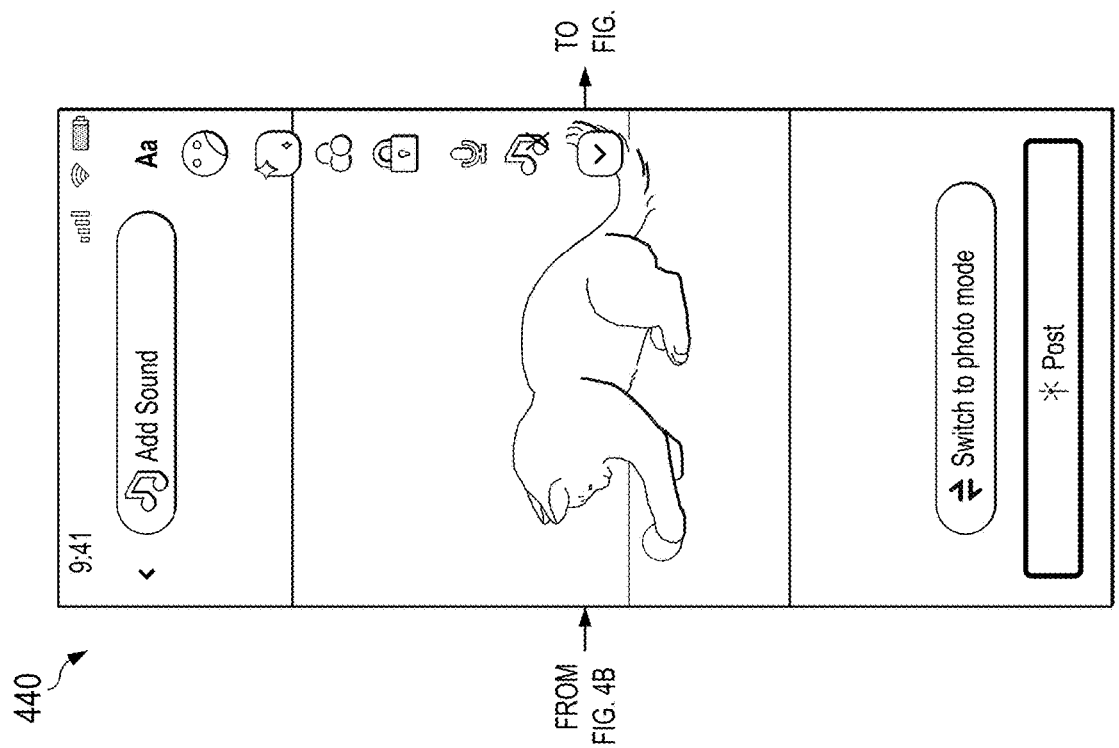
Figure 4B:
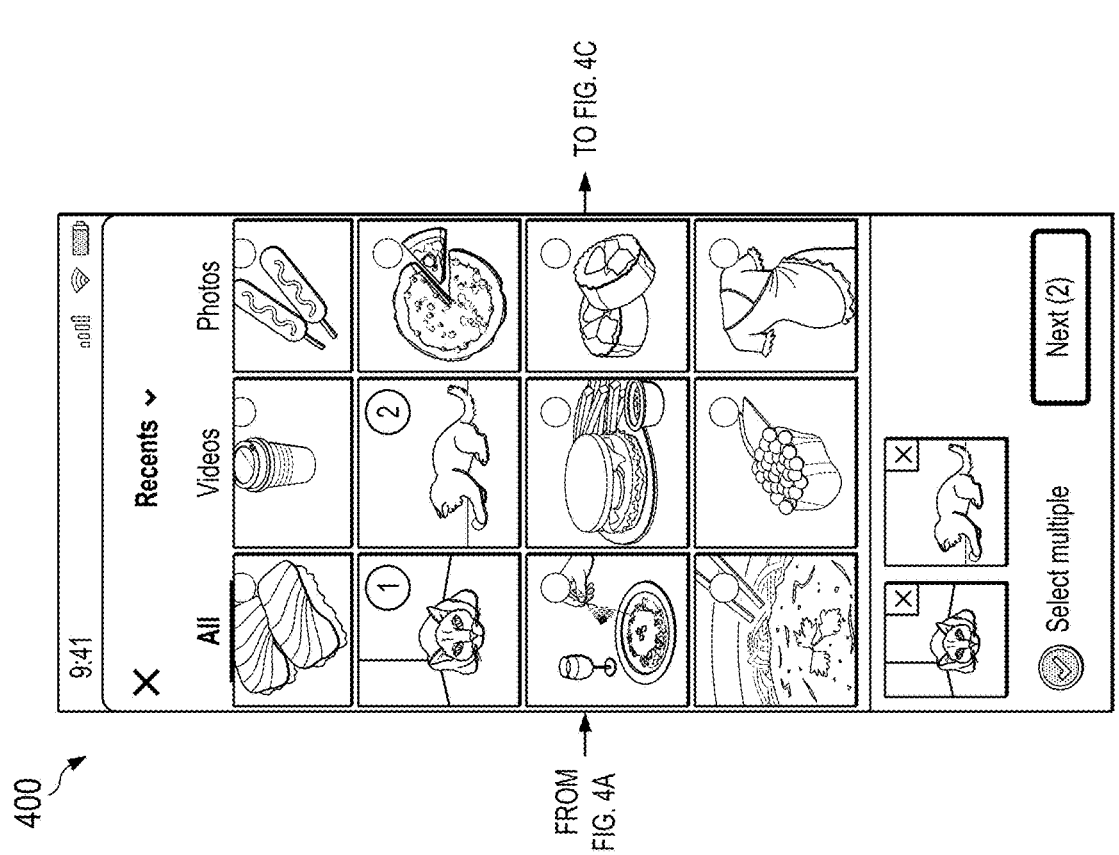

The system can transition from the user interface 100 of FIG. 4A to the user interface 400 of FIG. 4B upon receiving a user interaction to the interactive element 132. The user interface 400 is an example of a third user interface. The user interface 400 includes one or more interactive elements that enable the user to select one or more videos and/or photos from the media library. For example, the user interface 400 can display previews for videos and/or photos from the media library. After receiving user interactions indicating selection of one or more videos and/or photos, the system can update the user interface 400 to display a bar that displays previews for the selected videos and/or photos.

The system can transition from the user interface 400 of FIG. 4B to the user interface 440 of FIG. 4C upon receiving a user interaction that indicates the user has finished selecting videos and/or photos. For example, the system can receive a user interaction to a "Next" button. The user interface 440 is an example of a third user interface. The user interface 440 can include interactive elements that enable the user to edit features of the selected photos or videos. For example, the interactive elements can enable the user to add or edit audio, text, effects, filters, etc.

The system can transition from the user interface 440 of FIG. 4C to the user interface 460 of FIG. 4D upon receiving a user interaction that indicates the user has finished editing features of the photo or video through user interface 440. For example, the system can receive a user interaction to a "Next" or "Post" button. The user interface 460 is an example of a third user interface. The user interface 460 includes one or more interactive elements that enable the user to edit features of the media item including the selected photos and/or videos. For example, the interactive elements can enable the user to add or edit the corresponding text description for the media item, a location for the media item, permissions for the media item, etc.

In some implementations, as shown in FIG. 4D, the corresponding text description includes the hashtag 104 by default. For example, the interactive element that enables the user to add or edit the corresponding text description for the media item displays "#catslovers."

In some examples, the system can receive a user interaction to the interactive element that indicates an edit to the text "#catslovers," or removal of "#catslovers." In these examples, the new media item created may not include the hashtag "#catslovers."

FIG. 4D also includes a confirmation interactive element, such as the "Post" button, that indicates the user is finished creating the new media item. In some examples, in response to receiving the user interaction to the "Post" button, the system can also provide data representing the new media item to the database of media items, as described above with reference to the "Post" button of FIG. 3C.

The system can transition from the user interface 460 of FIG. 4D to the user interface 100 of FIG. 4E upon receiving a user interaction that indicates the user has finished editing features of the new media item through user interface 460. For example, the system can receive a user interaction to the "Post" button shown in FIG. 4D.

The user interface 100 of FIG. 4E is similar to the user interface 100 of FIG. 4A, but the system has updated the user interface 100 to include the new media item 462 created through FIGS. 4B-4D. In the example of FIG. 4, the system did not receive a user interaction indicating an edit or removal of the hashtag, e.g., through the user interface 460, so the new media item 462 automatically includes the hashtag 104. For example, the system displays the new media item 462 in the second portion 120. FIG. 4E also shows that the new media item 462 was added recently, as denoted by the text "just now," by the user, "User3."

In some examples, the system displays the new media item 462 in a top-ranked position of the second portion 120, relative to the positions of the media items of the search result. For example, the media item 462 is displayed in the top-ranked position, e.g., the top-left corner of the grid. The positions of the media items of the search result are adjusted by one position. That is, the top-ranked media item 122 is now displayed in the second-ranked position, e.g., the top-right corner of the grid. The second-ranked media item 124 is now displayed in the third-ranked position, e.g., the bottom-left corner of the grid. The third-ranked media item 126 is now displayed in the fourth-ranked position, e.g., the bottom-right corner of the grid. The system can thus display the new media item 462 created by the user in the top-ranked position among the media items associated with the hashtag 104, providing for a satisfying user experience.

FIGS. 5A-5D are illustrations of example user interfaces that enable users to create a new media item. In particular, FIGS. 5A-5D show a sequence of user interfaces for creating a new media item including inputted text, such as a plain text media item or a text-based media item.

FIG. 5A shows the same user interface 100 described above with reference to FIG. 1B. Upon receiving a user interaction, e.g., a selection, to the interactive element 136, the system provides a sequence of user interfaces that allow the user to input or edit text to include a new media item including the text.

The system can transition from the user interface 100 of FIG. 5A to the user interface 500 of FIG. 5B upon receiving a user interaction to the interactive element 136. The user interface 500 is an example of a third user interface. The user interface 500 includes one or more interactive elements, e.g., a text entry box, that enable the user to input text. The user can input text using a keyboard or a microphone, for example. The user interface 500 can also include interactive elements that enable the user to edit features of the text, such as font, size, format, and/or color. The user interface 500 shows that the media item includes the hashtag 104 by default. For example, the interactive element for inputting text displays "#catslovers." The user interface 500 can also include interactive elements that enable the user to edit the text. For example, the interactive elements can enable the user to add or edit audio, effects, filters, etc.

In some examples, the system can receive a user interaction to the interactive element for inputting text that indicates an edit to the text "#catslovers" or removal of "#catslovers." In these examples, the new media item created does not include the hashtag "#catslovers."

The system can transition from the user interface 500 of FIG. 5B to the user interface 540 of FIG. 5C upon receiving a user interaction that indicates the user has finished editing the text through user interface 500. For example, the system can receive a user interaction to a "Done" button or another interactive element that indicates a completion of the editing. The user interface 540 is an example of a third user interface. The user interface 540 includes one or more interactive elements that enable the user to edit features of the media item including the text. For example, the interactive elements can enable the user to add graphics or a background for the text of the media item.

FIG. 5C shows the inputted text from the user, which can include the hashtag 104 by default. FIG. 5C also includes a confirmation interactive element, the "Post" button, that indicates the user is finished creating the new media item. In some examples, in response to receiving the user interaction to the "Post" button, the system can also provide data representing the new media item to the database of media items, as described above with reference to the "Post" button of FIG. 3C.

The system can transition from the user interface 540 of FIG. 5C to the user interface 100 of FIG. 5D upon receiving a user interaction that indicates the user has finished editing features of the new media item through user interface 540. For example, the system can receive a user interaction to the "Post" button shown in FIG. 5C.

The user interface 100 of FIG. 5D is similar to the user interface 100 of FIG. 5A, but the system has updated the user interface 100 to include the new media item 542 created through FIGS. 5B-5C. In the example of FIG. 5, the system did not receive a user interaction indicating an edit or removal of the hashtag, e.g., through the user interface 500, so the new media item automatically includes the hashtag 104. For example, the system displays the new media item 542 in the second portion 120. FIG. 5D also shows that the new media item 542 was added recently, as denoted by the text "just now," by the user, "User3."

In some examples, the system displays the new media item 542 in a top-ranked position of the second portion 120, relative to the positions of the media items of the search result. For example, the media item 542 is displayed in the top-ranked position, e.g., the top-left corner of the grid. The positions of the media items of the search result are adjusted by one position. That is, the top-ranked media item 122 is now displayed in the second-ranked position, e.g., the top-right corner of the grid. The second-ranked media item 124 is now displayed in the third-ranked position, e.g., the bottom-left corner of the grid. The third-ranked media item 126 is now displayed in the fourth-ranked position, e.g., the bottom-right corner of the grid. The system can thus display the new media item 542 created by the user in the top-ranked position among the media items associated with the hashtag 104, providing for a satisfying user experience.

FIGS. 6A-6F are illustrations of example user interfaces that enable users to create a new media item. In particular, FIGS. 6A-6F include the sequence of user interfaces for creating a new media item including inputted text described above with reference to FIGS. 5A-5D.

For example, FIG. 6A shows the same user interface 100 as FIG. 5A. FIG. 6B shows the same user interface 500 as FIG. 5B, FIG. 6C shows the same user interface 540 as FIG. 5C, and FIG. 6F shows the same user interface 100 as FIG. 5D.

Figure 6E:
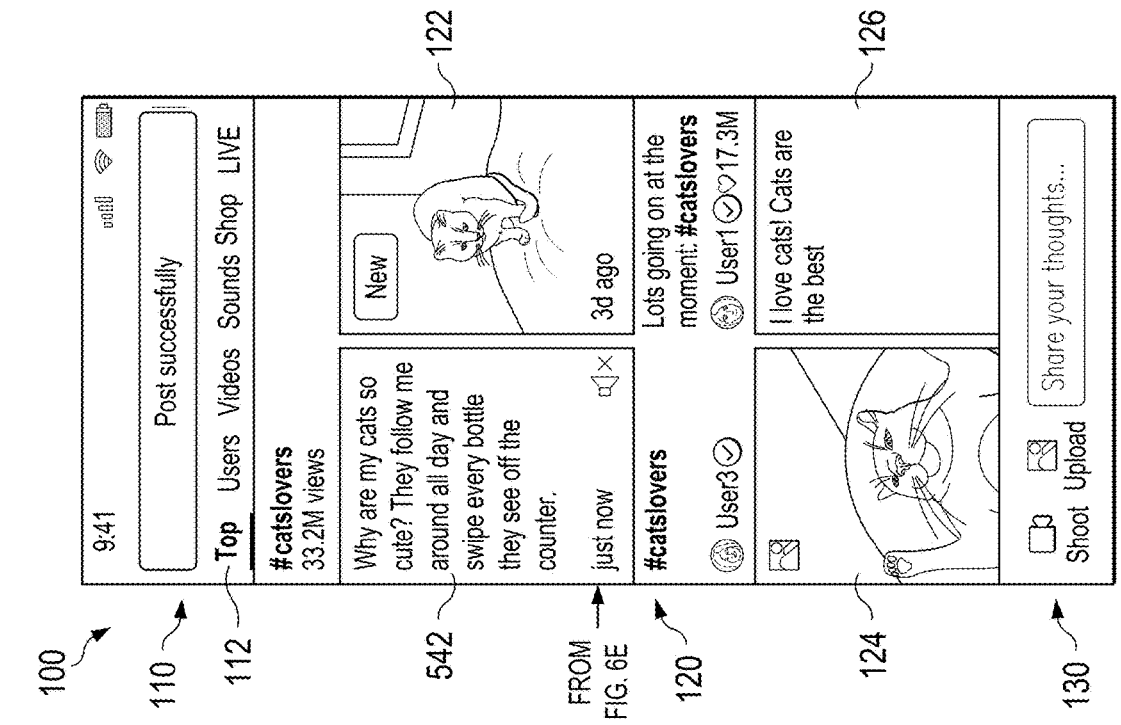

FIG. 6D and FIG. 6E display intermediate updates to the user interface 100. For example, the system transitions from the user interface 540 of FIG. 6C to the user interface 100 of FIG. 6D upon receiving an indication that the new media item created through FIGS. 6B-6C is being processed, e.g., added to the database of media items. The user interface 100 displays a progress bar or another progress indicator representing the status of adding the new media item to the database, shown in FIG. 6D as being at 60%. In some examples, the user interface 100 displays a placeholder for media items associated with the hashtag 104, for example, as an empty grid, while the system renders the data representing the media items associated with the hashtag 104.

The system transitions from the user interface 100 of FIG. 6D to the user interface 100 of FIG. 6E upon receiving an indication that the data representing the media items associated with the hashtag 104 has completed rendering. For example, the user interface 100 of FIG. 6E displays the media items associated with the hashtag 104, without the new media item 542. The system thus provides for a seamless user experience while the new media item 542 is processed.

Figure 6F:
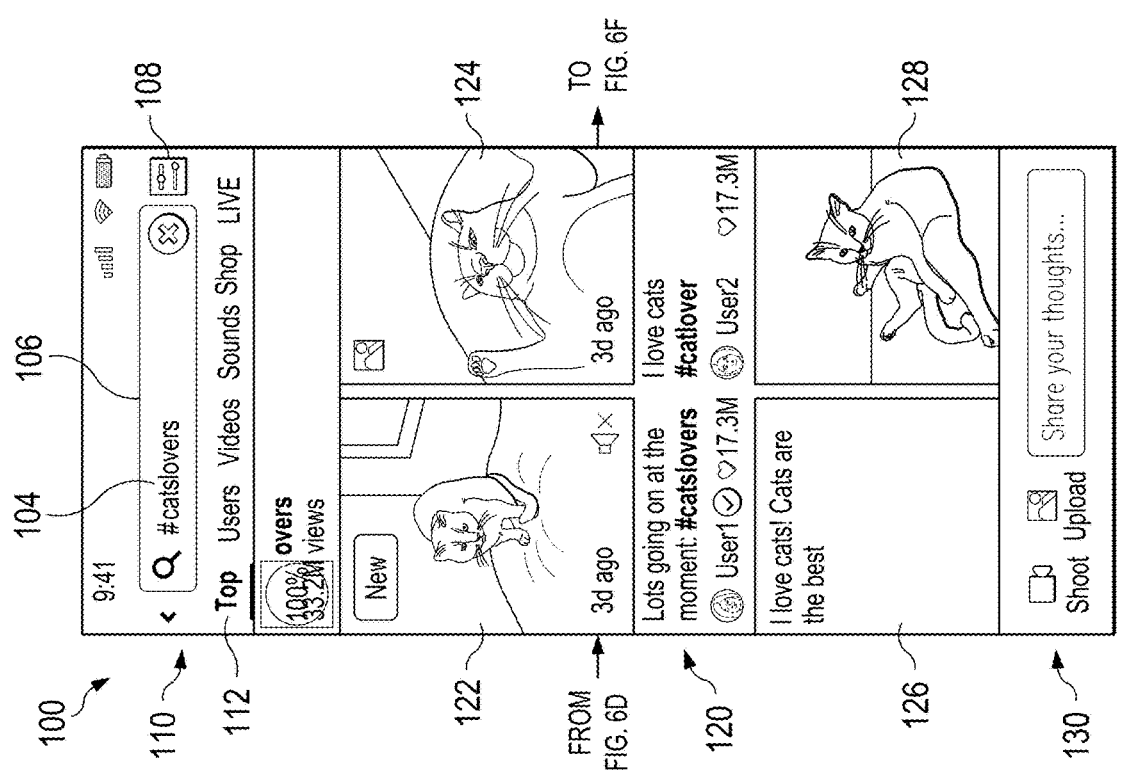

The system transitions from the user interface 100 of FIG. 6E to the user interface 100 of FIG. 6F upon receiving an indication that the new media item has been processed. As described above with reference to FIG. 5D, the user interface 100 displays the new media item 542.

Figure 7:
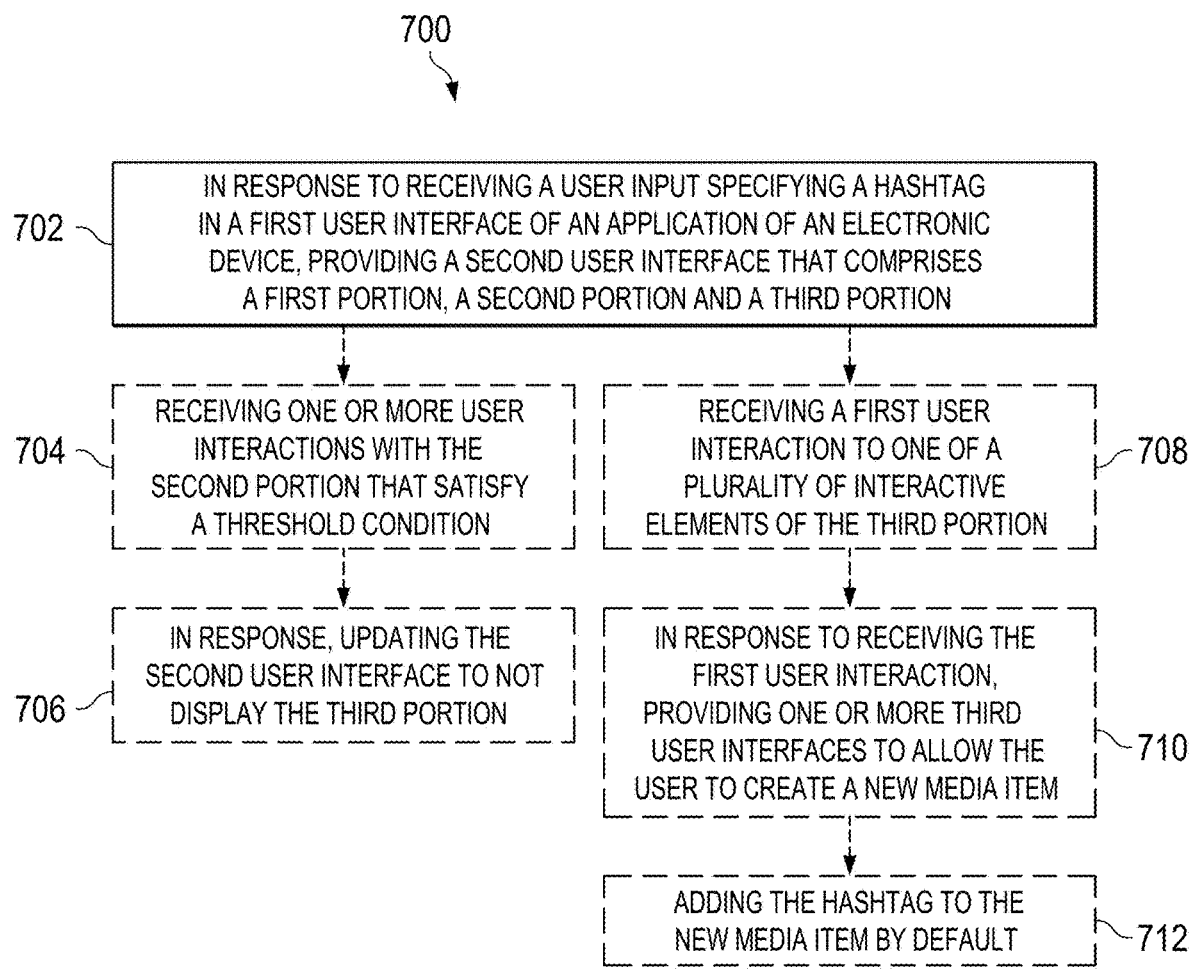
FIG. 7 is a flow diagram that illustrates an example process for displaying media items associated with a hashtag and enables users to create a new media item.

FIG. 7 is a flow diagram that illustrates an example process 700 for displaying media items associated with a hashtag and enabling users to create a new media item. The process 700 can be implemented, for example, by a system executing one or more programs of the application. In some implementations, they system can include an electronic device and one or more servers. The system, the electronic device, and/or the severs each can include one or more processors, and one or more computer-readable memories coupled to the one or more processors and having instructions stored thereon, wherein the instructions are executable by the one or more processors to perform some or all operations of the process 700, and/or additional or different operations. The process 700 will be described with reference to elements as illustrated in one or more of FIGS. 1-6. It should be noted that while the elements in one or more of FIGS. 1-6 are described herein as examples, these are not meant to be limiting, and the process 700 can be performed with respect to any suitable elements. The operations shown in process 700 may not be exhaustive and other operations can be performed as well before, after, or in between any of the illustrated operations. Further, some of the operations may be performed simultaneously, or in a different order than shown in FIG. 7.

In response to receiving a user input specifying a hashtag in a first user interface (e.g., the user interface 101) of an application of an electronic device, a second user interface (e.g., the user interface 100) that includes a first portion, a second portion, and a third portion is provided (702). In some implementations, providing the second user interface includes replacing the first user interface with the second user interface. The first user interface prompts a user to provide a user input specifying a hashtag, such as clicking on a hashtag in a post page or entering a hashtag in a search bar. The first user interface does not include one or more portions of the second user interface. For example, the first user interface does not include at least the second portion or the third portion of the second user interface.

The first portion is configured to receive a sequence of text that serves as one or more search keywords. In some implementations, the sequence of text comprises the hashtag or a variant by default. An example first portion 110 is described above with reference to FIG. 1B.

The second portion includes a search result based on the hashtag, and the search result includes multiple media items associated with the hashtag. An example second portion 120 is described above with reference to FIG. 1B. The media items can include, for example, text media items, graphic media items, and/or hybrid media items. In some examples, the media items associated with the hashtag include at least one media item that was not assigned the hashtag by a user. For example, the at least one media item can have a corresponding text description that does not include the hashtag.

In some examples, the system can obtain data representing the search result. The search result can be generated by performing a search algorithm, for example, by the electronic device itself, by one or more servers, or a combination of the electronic device and the one or more servers. For example, in response to receiving the user input specifying the hashtag, the system can provide data representing the hashtag to a search algorithm to identify the multiple media items associated with the hashtag from a database of media items.

For example, the search algorithm can identify media items that have a corresponding text description that includes the hashtag. The search algorithm can also identify media items that are related to the one or more search keywords of the hashtag, but for which the corresponding text descriptions do not include the hashtag. For example, the search algorithm can identify media items for which text representing the content of the media item includes the one or more search keywords.

As an example, the search algorithm can process text that is a transcription of the audio content for the media item. In some examples, the transcription can have been generated using speech to text algorithms. In some examples, the transcription can have been generated prior to the system receiving the user input specifying the hashtag from a user. For example, the transcription can be stored as metadata for the media item in the database.

The search algorithm can also process text that is displayed within the visual content of the media item. In some examples, the text that is displayed within the photos and/or videos of the media item can have been generated using optical character recognition (OCR) algorithms. In some examples, the text can have been generated prior to the system receiving the user input specifying the hashtag from a user. For example, the text can be stored as metadata for the media item in the database.

As another example, the search algorithm can process one or more synonyms for the search keywords of the hashtag. The search algorithm can identify media items that have a corresponding text description, transcription, or text displayed within the visual content of the media item that includes the one or more synonyms.

In some implementations, the system can display the identified media items according to a ranking. For example, the data representing the search result can include a respective ranking for each of the identified media items that is relative to the other identified media items. For example, the rankings can have been generated by a ranking algorithm.

For example, the ranking for each of the media items can be determined based on features such as content of the media item, a relevance of the content of the media item to the hashtag, a text description for the media item, a creation time for the media item, a creator of the media item, an interaction history of the media item such as an interaction history of one or more other users who have viewed the media item, or an interaction history of a user of the electronic device.

For example, the ranking algorithm can determine a measure of relevance of the content of the media item to the hashtag based on, for example, a number of matches of the hashtag to the corresponding text description or to text representing the content of the media item, or based on whether the search keywords are matched or synonyms for the search keywords are matched.

As another example, the ranking algorithm can determine a measure of quality for the media item based on the content of the media item. For example, the ranking algorithm can determine a measure representing information density or total amount of information for the media item.

As another example, the ranking algorithm can determine the ranking based on timing information for the media item, such as creation time, one or more times corresponding to updates to the media item, or a measure of novelty for the media item.

As another example, the ranking algorithm can determine the ranking based on information about the creator of the media item. As another example, the ranking algorithm can determine the ranking based on an interaction history of the user of the electronic device, such as information about similar media items the user has viewed or interacted with. In some examples, the interaction history of the user of the electronic device includes information about media items the user has viewed or interacted with on the electronic device and other electronic devices on which the user used the application while signed into the same account for the platform. The ranking algorithm can also determine the ranking based on an interaction history of the media item that includes an interaction history of one or more other users who have viewed or interacted with the media item, such as information about viewing the media item, liking the media item, commenting on the media item, or sharing the media item.

In some examples, the search results for different users and/or for the same user at different times can be different. For example, the search results can include different media items and/or a different ranking for the media items. For example, for a particular user, the system can determine different rankings based on the interaction history of the user of the electronic device. Each user may have a different interaction history and thus the system may determine different rankings and a different search result for a first user than for a second user.

The third portion is configured to receive one or more user interactions for creating a new media item. An example third portion 130 is described above with reference to FIG. 1B. In some implementations, the third portion can be a hidable third portion, as described with reference to FIG. 2. For example, in some implementations, rather than persistently displaying the third portion in different user interfaces or pages of the application, the system does not provide the third portion for display until the system provides the second user interface for display. For example, the system may not provide the third portion for display on other user interfaces or pages of the application that precedes or is displayed subsequent to the second user interface. In some implementations, the system provides the third portion for display upon receiving the user input specifying the hashtag, and upon providing the first portion and second portion for display.

In some implementations, the new media item automatically includes the hashtag. For example, if the new media item is a graphic media item or hybrid media item that includes a video and/or photo, the new media item can include the hashtag in a corresponding text description. If the new media item is a text media item, the new media item can include the hashtag in the text of the media item.

In some examples, the user can remove the hashtag, e.g., during creation of the new media item. For example, the system can receive a user instruction to remove the hashtag from the new media item. In response, the system can remove the hashtag from the new media item. In these examples, the new media item does not automatically include the hashtag.

In some implementations, the system receives one or more user interactions with the second portion that satisfy a threshold condition (704). For example, the threshold condition can be a threshold number of upward or downward scrolls. Other examples of threshold conditions are described with reference to FIG. 2. The threshold conditions can be predetermined, for example.

In response, the system updates the second user interface to not display the third portion (706). For example, the system can hide the third portion and replace the area the third portion covered with the second portion.

In some implementations, the system determines a time duration for a display of the third portion in the second user interface. In response to determining that the time duration exceeds a threshold time, the system can update the second user interface to not display the third portion. The threshold time can be predetermined, for example.

In some implementations, the third portion is a hidable third portion. The hidable third portion includes multiple interactive elements for receiving one or more user interactions for creating a new media item. For example, the interactive elements can include a first interactive element controllable to access a camera accessible by the application, a second interactive element controllable to access a media library accessible by the application, and a third interactive element controllable to receive a text input. In some examples, the hidable third portion can include interactive elements controllable to create other types of new media items. In some implementations, the hidable third portion shows the multiple interactive elements at the same time, allowing the user to choose one of the method to create the new media item directly from the second user interface.

In these implementations, the system can receive a first user interaction to one of the multiple interactive elements (708). For example, the system can receive a selection to one of the multiple interactive elements.

In response to receiving the first user interaction, the system provides one or more third user interfaces to allow the user to create a new media item (710). The one or more third user interfaces allow the user to create and edit the new media item in a variety of ways, for example, each corresponding to one of the interactive elements. For example, in response to receiving the first user interaction to the first interactive element, the system can provide one or more third user interfaces that allow the user to create a new media item by capturing a photo or video using a camera accessible by the application, as described with reference to FIGS. 3A-3C. In response to receiving the first user interaction to the second interactive element, the system can provide one or more third user interfaces that allow the user to create a new media item by selecting one or more existing photos and/or videos from a media library accessible by the application, as described with reference to FIGS. 4A-4D. In response to receiving the first user interaction to the third interactive element, the system can provide one or more third user interfaces that allow the user to create a new media item by inputting text, as described with reference to FIGS. 5A-5C.

In some implementations, the system adds the hashtag to the new media item by default (712). For example, the system can include the hashtag in a corresponding text description for the new media item as shown in FIGS. 3C and 4D. The system can also include the hashtag in the text of the new media item as shown in FIGS. 5B-5C and 6B-6C.

In addition, in response to receiving a second user interaction indicating finishing creation of the new media item, the system provides the second user interface for display. For example, the system provides the user interface 100 of FIG. 1B, with the new media item displayed in the second portion of the user interface 100. For example, the new media item is displayed in a top-ranked position of the second portion relative to respective positions of the media items of the search result. Example user interfaces showing the new media item displayed in the top-ranked position are shown in FIGS. 3D, 4E, 5D, and 6F.

Figure 8:
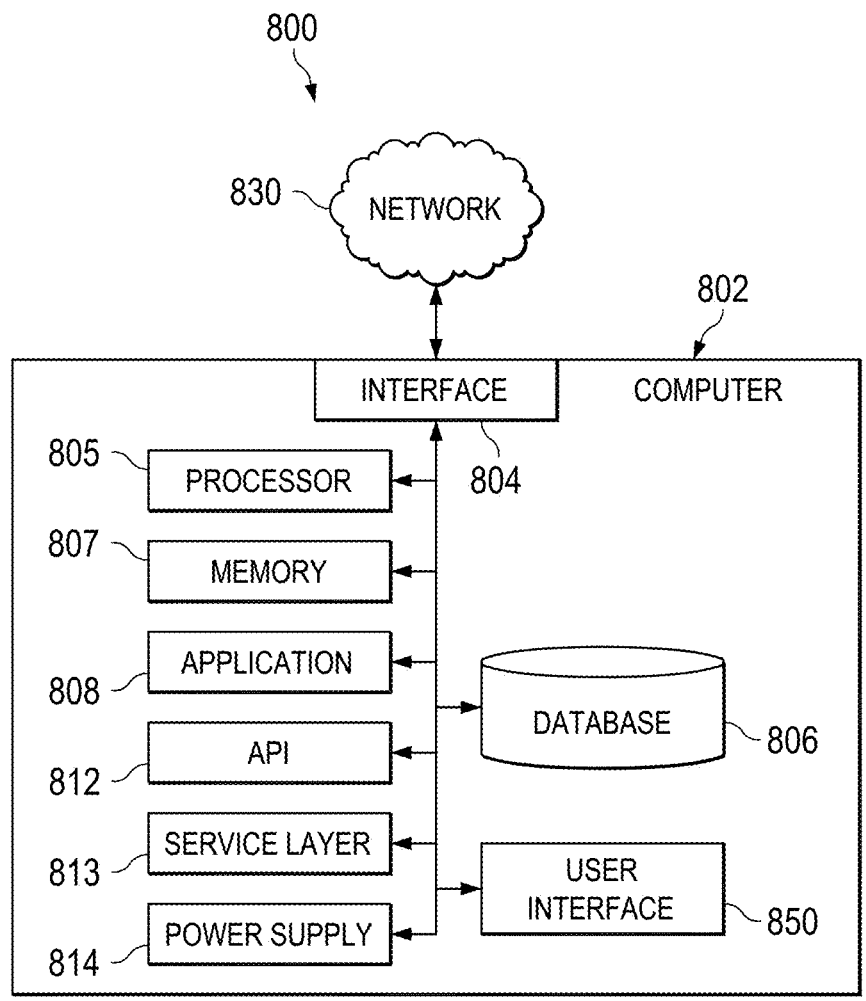
FIG. 8 is a block diagram of an example computer system.

FIG. 8 illustrates a block diagram of an example computer system 800 used to provide computational functionalities associated with described algorithms, methods, functions, processes, flows, and procedures, as described in the disclosure, according to one or more implementations. The example computer system 800 can include an electronic device 802 and a network 830. The computer system 800 can include additional or different components, such as, one or more remote servers that are communicatively linked with the electronic device 802.

The electronic device 802 can include a digital TV, a desktop computer, a work station, a smart appliance, or another stationary terminal. In some implementations, the electronic device 802 is a portable device, such as, a notebook computer, a digital broadcast receiver, a handheld device, a portable multimedia player (PMP), an in-vehicle terminal, an Internet of Things (IoT) device. For example, the electronic device 802 can be a phone, a smartphone, a pad (tablet computer), a digital assistant device (e.g., a PDA (personal digital assistant)), or another handheld device.

In some aspects, the electronic device 802 may include a computer that includes a user interface 850. The user interface 850 can include an input device, such as a keypad, keyboard, touch screen/touch display, camera, microphone, accelerometer, gyroscope, AR/VR sensors, or other device that can accept user information, and an output device that conveys information associated with the operation of the electronic device 802, including digital data, visual, or audio information (or a combination of information), or a graphical user interface (GUI). In some implementations, the user interacts with the GUI, for example, through contacts and/or gestures on or in front of the touch screen, for example, to implement the functions such as digital photographing/videoing, instant messaging, social network interacting, image/video editing, drawing, presenting, word/text processing, website creating, game playing, telephoning, video conferencing, e-mailing, web browsing, digital music/digital video playing, etc.

The electronic device 802 can serve in a role as a client, network component, a server, a database or other persistency, or any other component (or a combination of roles) of a computer system for performing the subject matter described in the instant disclosure. The illustrated electronic device 802 is communicably coupled with a network 830. In some implementations, one or more components of the electronic device 802 may be configured to operate within environments, including cloud-computing-based, local, global, or other environment (or a combination of environments).

At a high level, the electronic device 802 is an electronic computing device operable to receive, transmit, process, store, or manage data and information associated with the described subject matter. According to some implementations, the electronic device 802 may also include, or be communicably coupled with, an application server, e-mail server, web server, caching server, streaming data server, or other server (or a combination of servers).

The electronic device 802 can receive requests over network 830 from a client application (for example, executing on another electronic device 802) and respond to the received requests by processing the received requests using an appropriate software application(s). In addition, requests may also be sent to the electronic device 802 from internal users (for example, from a command console or by other appropriate access methods), external or third-parties, other automated applications, as well as any other appropriate entities, individuals, systems, or computers.

Each of the components of the electronic device 802 can communicate using a system bus 803. In some implementations, any or all of the components of the electronic device 802, hardware or software (or a combination of both hardware and software), may interface with each other or the interface 804 (or a combination of both), over the system bus 803 using an application programming interface (API) 812 or a service layer 813 (or a combination of the API 812 and service layer 813). The API 812 may include specifications for routines, data structures, and object classes. The API 812 may be either computer-language independent or dependent and refer to a complete interface, a single function, or even a set of APIs. The service layer 813 provides software services to the electronic device 802 or other components (whether or not illustrated) that are communicably coupled to the electronic device 802. The functionality of the electronic device 802 may be accessible for all service consumers using this service layer. Software services, such as those provided by the service layer 813, provide reusable, defined functionalities through a defined interface. For example, the interface may be software written in JAVA, C++, or other suitable language providing data in extensible markup language (XML) format or other suitable formats. While illustrated as an integrated component of the electronic device 802, alternative implementations may illustrate the API 812 or the service layer 813 as stand-alone components in relation to other components of the electronic device 802 or other components (whether or not illustrated) that are communicably coupled to the electronic device 802. Moreover, any or all parts of the API 812 or the service layer 813 may be implemented as child or sub-modules of another software module, enterprise application, or hardware module without departing from the scope of this disclosure.

The electronic device 802 includes an interface 804. Although illustrated as a single interface 804 in FIG. 8, two or more interfaces 804 may be used according to particular needs, desires, or particular implementations of the electronic device 802. The interface 804 is used by the electronic device 802 for communicating with other systems that are connected to the network 830 (whether illustrated or not) in a distributed environment. Generally, the interface 804 includes logic encoded in software or hardware (or a combination of software and hardware) and is operable to communicate with the network 830. More specifically, the interface 804 may include software supporting one or more communication protocols associated with communications such that the network 830 or interface's hardware is operable to communicate physical signals within and outside of the illustrated electronic device 802.

The electronic device 802 includes a processor 805. Although illustrated as a single processor 805 in FIG. 8, two or more processors may be used according to particular needs, desires, or particular implementations of the electronic device 802. Generally, the processor 805 executes instructions and manipulates data to perform the operations of the electronic device 802 and any algorithms, methods, functions, processes, flows, and procedures as described in the instant disclosure.

The electronic device 802 also includes a database 806 that can hold data for the electronic device 802 or other components (or a combination of both) that can be connected to the network 830 (whether illustrated or not). For example, database 806 can be an in-memory, conventional, or other type of database storing data consistent with this disclosure. In some implementations, database 806 can be a combination of two or more different database types (for example, a hybrid in-memory and conventional database) according to particular needs, desires, or particular implementations of the electronic device 802 and the described functionality. Although illustrated as a single database 806 in FIG. 8, two or more databases (of the same or combination of types) can be used according to particular needs, desires, or particular implementations of the electronic device 802 and the described functionality. While database 806 is illustrated as an integral component of the electronic device 802, in alternative implementations, database 806 can be external to the electronic device 802.

The electronic device 802 also includes a memory 807 that can hold data for the electronic device 802 or other components (or a combination of both) that can be connected to the network 830 (whether illustrated or not). For example, memory 807 can include a non-transitory computer readable storage medium or other computer program product that store executable instructions configured for execution by one or more processors 805 for performing the functionality described in this disclosure. Memory 807 can be Random Access Memory (RAM), Read Only Memory (ROM), optical, magnetic, and the like, storing data consistent with this disclosure. In some implementations, memory 807 can be a combination of two or more different types of memory (for example, a combination of RAM and magnetic storage) according to particular needs, desires, or particular implementations of the electronic device 802 and the described functionality. Although illustrated as a single memory 807 in FIG. 8, two or more memories 807 (of the same or a combination of types) can be used according to particular needs, desires, or particular implementations of the electronic device 802 and the described functionality. While memory 807 is illustrated as an integral component of the electronic device 802, in alternative implementations, memory 807 can be external to the electronic device 802.

The application 808 is an algorithmic software engine providing functionality according to particular needs, desires, or particular implementations of the electronic device 802, particularly with respect to functionality described in this disclosure. The application 808 can be associated with a platform that includes one or more application servers. For example, application 808 can include one or more of a social network application, video sharing application, text/image/video/audio editing/presentation application, etc. Application 808 can serve as one or more components, modules, or applications. Further, although illustrated as a single application 808, the application 808 may be implemented as multiple applications 808 on the electronic device 802. In addition, although illustrated as integral to the electronic device 802, in alternative implementations, at least part of the application 808 can be external to the electronic device 802. For example, one or more programs of the application 808 can execute on an application server remote to the electronic device 802.

The electronic device 802 can also include a power supply 814. The power supply 814 can include a rechargeable or non-rechargeable battery that can be configured to be either user- or non-user-replaceable. In some implementations, the power supply 814 can include power-conversion or management circuits (including recharging, standby, or other power management functionality). In some implementations, the power supply 814 can include a power plug to allow the electronic device 802 to be plugged into a wall socket or other power source to, for example, power the electronic device 802 or recharge a rechargeable battery.

There may be any number of computers 802 associated with, or external to, a computer system containing electronic device 802, each electronic device 802 communicating over network 830. Further, the term "client," "user," and other appropriate terminology may be used interchangeably, as appropriate, without departing from the scope of this disclosure. Moreover, this disclosure contemplates that many users may use one electronic device 802, or that one user may use multiple computers 802.

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present disclosure.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described example implementations, but should be defined only in accordance with the following claims and their equivalents. Accordingly, other implementations also are within the scope of the claims.

What is claimed is:

1. A method, comprising:
   in response to receiving a user input specifying a hashtag in a first user interface of an application of an electronic device, replacing, for display by the electronic device, the first user interface with a second user interface that comprises a first portion, a second portion, and a third portion, wherein:
   the first portion is configured to receive a sequence of text, and the sequence of text comprises the hashtag by default;
   the second portion comprises a search result based on the hashtag, the search result comprises a plurality of media items associated with the hashtag; and
   the third portion is configured to receive one or more user interactions for creating a new media item, wherein the third portion is a hidable third portion and the method further comprises:
   receiving one or more user interactions with the second portion that satisfy a threshold condition; and
   in response, updating the second user interface to not display the third portion.

2. The method of claim 1, wherein the new media item automatically comprises the hashtag.

3. The method claim 2, further comprising:
   receiving a user instruction to remove the hashtag from the new media item; and
   removing the hashtag from the new media item.

4. The method of claim 1, wherein the first user interface does not include the third portion.

5. The method of claim 1, wherein the plurality of media items associated with the hashtag comprise a text-based media item, a graphic media item, or a hybrid media item.

6. The method of claim 1, wherein the search result based on the hashtag for a first user is different from a search result based on the hashtag for a second user.

7. The method of claim 1, wherein the plurality of media items associated with the hashtag comprise at least one media item that was not assigned the hashtag by a user.

8. The method of claim 1, wherein in response to receiving the user input specifying the hashtag, the method further comprises obtaining data representing the search result, and wherein the search result is generated by performing a search algorithm to identify the plurality of media items associated with the hashtag from a database of media items.

9. The method of claim 8, wherein the data representing the search result comprises a respective ranking for each of the plurality of media items and wherein the method further comprises:
displaying the plurality of media items according to respective rankings, wherein a respective ranking for a media item is determined based on features comprising one or more of: content of the media item, a relevance of the content of the media item to the hashtag, a text description for the media item, a creation time for the media item, a creator of the media item, an interaction history of the media item, or an interaction history of a user of the electronic device.

10. The method of claim 1, further comprising:
determining a time duration for a display of the third portion in the second user interface; and
in response to determining that the time duration exceeds a threshold time, updating the second user interface to not display the third portion.

11. The method of claim 1, wherein the hidable third portion comprises a plurality of interactive elements for receiving the one or more user interactions for creating the new media item, and wherein the plurality of interactive elements comprise:
a first interactive element controllable to access a camera accessible by the application,
a second interactive element controllable to access a media library accessible by the application, and
a third interactive element controllable to receive a text input.

12. The method of claim 11, further comprising:
receiving a first user interaction to one of the plurality of interactive elements;
in response to receiving the first user interaction, providing one or more third user interfaces to allow a user to create the new media item; and
adding the hashtag to the new media item by default.

13. The method of claim 11, further comprising:
receiving a first user interaction to one of the plurality of interactive elements;
in response to receiving the first user interaction, providing one or more third user interfaces to allow a user to create the new media item; and
in response to receiving a second user interaction indicating finishing creation of the new media item, providing the second user interface, wherein the new media item is displayed in the second portion of the second user interface.

14. The method of claim 13, wherein the new media item is displayed in a top-ranked position of the second portion relative to respective positions of the plurality of media items.

15. An apparatus, comprising:
one or more processors; and
one or more computer-readable memories coupled to the one or more processors and having instructions stored thereon, wherein the instructions are executable by the one or more processors to perform operations comprising:
in response to receiving a user input specifying a hashtag in a first user interface of an application of an electronic device, replacing, for display by the electronic device, the first user interface with a second user interface that comprises a first portion, a second portion, and a third portion, wherein:
the first portion is configured to receive a sequence of text, and the sequence of text comprises the hashtag by default;
the second portion comprises a search result based on the hashtag, the search result comprises a plurality of media items associated with the hashtag; and
the third portion is configured to receive one or more user interactions for creating a new media item, wherein the third portion is a hidable third portion and the operations further comprise:
receiving one or more user interactions with the second portion that satisfy a threshold condition; and
in response, updating the second user interface to not display the third portion.

16. The apparatus of claim 15, wherein the new media item automatically comprises the hashtag.

17. The apparatus of claim 15, wherein the plurality of media items associated with the hashtag comprise at least one media item that was not assigned the hashtag by a user.

18. The apparatus of claim 15, wherein the hidable third portion comprises a plurality of interactive elements for receiving the one or more user interactions for creating the new media item, and wherein the plurality of interactive elements comprise:
a first interactive element controllable to access a camera accessible by the application,
a second interactive element controllable to access a media library accessible by the application, and
a third interactive element controllable to receive a text input.

19. A non-transitory computer readable storage medium, wherein the non-transitory computer readable storage medium stores programing instructions executable by one or more processors to perform operations comprising:
in response to receiving a user input specifying a hashtag in a first user interface of an application of an electronic device, replacing, for display by the electronic device, the first user interface with a second user interface that comprises a first portion, a second portion, and a third portion, wherein:
the first portion is configured to receive a sequence of text, and the sequence of text comprises the hashtag by default;
the second portion comprises a search result based on the hashtag, the search result comprises a plurality of media items associated with the hashtag; and
the third portion is configured to receive one or more user interactions for creating a new media item, wherein the third portion is a hidable third portion and the operations further comprise:
receiving one or more user interactions with the second portion that satisfy a threshold condition; and
in response, updating the second user interface to not display the third portion.

* * * * *